US012566503B2

(12) United States Patent
Danieau et al.

(10) Patent No.: US 12,566,503 B2
(45) Date of Patent: Mar. 3, 2026

(54) REPRESENTATION FORMAT FOR HAPTIC OBJECT

(71) Applicant: InterDigital CE Patent Holdings, SAS, Paris (FR)

(72) Inventors: Fabien Danieau, Rennes (FR); Quentin Galvane, Thorigné-Fouillard (FR); Philippe Guillotel, Vern sur Seiche (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 188 days.

(21) Appl. No.: 18/036,683

(22) PCT Filed: Oct. 22, 2021

(86) PCT No.: PCT/EP2021/079400
§ 371 (c)(1),
(2) Date: May 12, 2023

(87) PCT Pub. No.: WO2022/100985
PCT Pub. Date: May 19, 2022

(65) Prior Publication Data
US 2023/0418381 A1     Dec. 28, 2023

(30) Foreign Application Priority Data

| Nov. 12, 2020 | (EP) | .................................... 20306362 |
| Jul. 28, 2021 | (EP) | .................................... 21306048 |
| Sep. 10, 2021 | (EP) | .................................... 21306241 |

(51) Int. Cl.
*G06F 3/01*          (2006.01)

(52) U.S. Cl.
CPC .............. *G06F 3/016* (2013.01); *G06F 3/011* (2013.01)

(58) Field of Classification Search
CPC .............................. G06F 3/016; G06T 19/003
See application file for complete search history.

(56) References Cited

U.S. PATENT DOCUMENTS

| 2007/0130212 A1 | 6/2007 | Peurach et al. |
| 2010/0013653 A1* | 1/2010 | Birnbaum ............... G06F 3/167 |
| | | 340/669 |

(Continued)

FOREIGN PATENT DOCUMENTS

| JP | 2018136938 A | 8/2018 |
| WO | 2020160129 A1 | 8/2020 |

OTHER PUBLICATIONS

Anonymous, "WAV: The Waveform Audio File Format", Wikipedia, The Free Encyclopedia, Retrieved form the Internet on Feb. 28, 28, 2023, URL: https://fr.wikipedia.org/wiki/Waveform_Audio_File_Format, 7 pages, 2023.

(Continued)

*Primary Examiner* — Charles Tseng
(74) *Attorney, Agent, or Firm* — Condo Roccia Koptiw LLP

(57)          ABSTRACT

A haptic rendering device and corresponding rendering method allow to render a haptic effect defined in a haptic signal comprising information representative of an immersive scene description. The immersive scene comprises information representative of at least one element of the scene and information representative of a haptic object, comprising a type of haptic effect, at least one parameter of the haptic effect, and a haptic volume or surface where the haptic effect is active. The parameter of the haptic effect may be a haptic texture map. A corresponding syntax is proposed.

20 Claims, 8 Drawing Sheets

(56) References Cited

U.S. PATENT DOCUMENTS

| | | | |
|---|---|---|---|
| 2011/0066406 A1* | 3/2011 | Tsai | G06F 3/016 703/2 |
| 2018/0232051 A1 | 8/2018 | Wu et al. | |
| 2022/0108534 A1* | 4/2022 | You | G06F 3/011 |

OTHER PUBLICATIONS

Anonymous, "A Standard for Haptics-Enabled Media Files", Electronic Design.com, Retrieved from the Internet on Feb. 28, 2023, URL: https://www.electronicdesign.com/technologies/analog/article/21136731/a-standard-forhapticsenabled-media-files, Jul. 29, 2020, 9 pages.

Anonymous, "Information technology—Coding of audio-visual objects—Part 12: ISO base media file format", International Organization for Standardization (ISO), International Standard Document: ISO/IEC 14496-12, Fifth edition, Feb. 20, 2015, 256 pages.

Anonymous, "The MPEG-V System Architecture", MPEG Document Management System (MDMS), Retrieved from the Internet on Mar. 3, 2023, URL: http://wg11.sc29.org/mpeg-v, 1 page.

Anonymous, "Representing Haptic Patterns in AHAP Files: Understanding the Apple Haptic and Audio Pattern (AHAP) file format", Apple Developer Documentation, Retrieved from the Internet on Feb. 28, 2023, URL: https://developer.apple.com/documentation/corehaptics/representing_haptic_patterns_in_ahap_files, 8 pages.

Higashi et al., "Hardness Perception by Tapping: Effect of Dynamic Stiffness of Objects", Institute of Electronics and Electrical Engineers (IEEE), IEEE World Haptics Conference (WHC), Munich, Germany, Jun. 6, 2017, 5 pages.

Danieau et al., "HFX Studio: Haptic Editor for Full-Body Immersive Experiences", Association for Computing Machinery (ACM), VRST '18: Proceedings of the 24th ACM Symposium on Virtual Reality Software and Technology, Article No. 37, Nov. 28, 2018, 9 pages.

Anonymous, "gITF—Runtime 3D Asset Delivery", KhronosGroup / gITF, retrieved from the Internet on May 2, 2023, URL: https://github.com/KhronosGroup/gITF, 7 pages., 2023.

Anonymous, "gITF—Tutorials: Buffers, BufferViews, and Accessors" KhronosGroup / gITF—Tutorials, Retrieved from the Internet on May 2, 2023, URL: https://github.com/KhronosGroup/gITF-tutorials/blob/master/gltfTutorial/gltfTutorial_005_BuffersBufferViewsAccessors.md, 10 pages, 2023.

Anonymous, "Call for Proposals on the Coded Representation of Haptics—Phase 1", International Organization for Standardization (ISO), MPEG Technical Requirements, ISO/IEC JTC 1/SC 29/WG 2, Document: N0070, Online meeting, Apr. 30, 2021, 32 pages.

Anonymous, "Haptic Codecs for the Tactile Internet", Institute of Electrical and Electronics Engineers (IEEE), IEEE Standards Association; Working Group Site & Liaison Index, Haptic Codec Task Group P1918 1.1, Retrieved from the Internet on Feb. 28, 2023, URL: https://grouper.ieee.org/groups/1918/1/haptic_codecs/index.html, 1 page.

* cited by examiner

200

Obtain Haptic Object — 201

No ◁— Collision Detected —▷ 202

Yes ↓

Select Haptic Signal and Actuators — 203

Apply Signal to Actuators — 204

300

1700

1710

1720

```
{
  "extensionsUsed": [                                          ← 2090
    "IDCC_Haptics"
  ],
  "accessors": [                                               ← 2085
    { "bufferView": 0, "componentType": 5126, "count": 3245, "type": "VEC3",
      "max": [3.4340000152587891, 3.1500000953674316, 2.0],
      "min": [-3.0, 0.0, -2.0]
    },
    { "bufferView": 1, "componentType": 5126, "count": 3245, "type": "VEC3",
      "max": [0.99968111515045166, 1.0, 0.99998235702514648],
      "min": [-0.99984896183013916, -1.0, -0.99997830390930176]
    },
    { "bufferView": 2, "componentType": 5126, "count": 3245, "type": "VEC4",
      "max": [-1.0, 0.0, 0.0, 1.0],
      "min": [-1.0, 0.0, 0.0, 1.0]
    },
    { "bufferView": 3, "componentType": 5123, "count": 18960, "type": "SCALAR",
      "max": [3244.0],
      "min": [0.0]
    }
  ],
  "asset": {                                                   ← 2080
    "version": "2.0"
  },
  "buffers": [                                                 ← 2075
    {
      "uri": "teapot.bin",
      "byteLength": 167720
    }
  ],
  "bufferViews": [                                             ← 2070
    { "buffer": 0, "byteLength": 38940},
    { "buffer": 0, "byteOffset": 38940, "byteLength": 38940},
    { "buffer": 0, "byteOffset": 77880, "byteLength": 51920},
    { "buffer": 0, "byteOffset": 129800, "byteLength": 37920}
  ],
  "materials": [
    {                                                          ← 2060
      "pbrMetallicRoughness": {
      "baseColorFactor": [0.8, 0.8, 0.8, 1.0],
      "metallicFactor": 0.0
      },
      "name": "defaultMat"
    }
  ],
```

Continued From Figure 8A

```
2050  {  "meshes": [
          { "primitives": [
              {
                "attributes": {"POSITION": 0, "NORMAL": 1, "TANGENT": 2},
          "indices": 3,  "material": 0
              }
          ], "name": "teapot"
          }

2040  {  ],
          "images": [
          { "uri": "teapot_temperature.png" }
          ], 2010  {  "nodes": [
          { "children": [1],
            "mesh": 0,
            "translation": [-2.08072662,-1.97073841,3.148683],    }  2020
            "name": "teapot"
          },
          {
            "name": "Vibration Object",
            "extensions": {
              "IDCC_Haptics": {
                "shapeType": 2,
                "vibration": {                              }  2031     }  2030
                  "frequency": 250.0,
                  "intensity": 0.7
                }
              },
              "IDCC_haptics.maps": {
                "temperature": {
                "index": 0                                  }  2032
                }
              }
            }
          }

2001  {  ],
          "scene": 0,
          "scenes": [{"nodes": [0], "name": "teapot"}]
          }
```

Figure 8B

REPRESENTATION FORMAT FOR HAPTIC OBJECT

CROSS REFERENCE TO RELATED APPLICATIONS

This application is a U.S. National Stage Application under 35 U.S.C. § 371 of International Patent Application No. PCT/EP2021/079400, filed Oct. 22, 2021, which is incorporated herein by reference in its entirety.

This application claims priority to European Application Nos. (i) 20306362.3 filed Nov. 12, 2020, (ii) 21306048.6 filed Jul. 28, 2021, and (iii) 21306241.7 filed Sep. 10, 2021, each of which is incorporated herein by reference in its entirety.

TECHNICAL FIELD

At least one of the present embodiments generally relates to haptics and more particularly to the definition of a representation format for haptic objects in immersive scenes based on glTF™ (Graphics Language Transmission Format).

BACKGROUND

Fully immersive user experiences are proposed to users through immersive systems based on feedback and interactions. The interaction may use conventional ways of control that fulfill the need of the users. Current visual and auditory feedback provide satisfying levels of realistic immersion. Additional feedback can be provided by haptic effects that allow a human user to perceive a virtual environment with his senses and thus get a better experience of the full immersion with improved realism. However, haptics is still one area of potential progress to improve the overall user experience in an immersive system.

Conventionally, an immersive system may comprise a 3D scene representing a virtual environment with virtual objects localized within the 3D scene. To improve the user interaction with the elements of the virtual environment, haptic feedback may be used through stimulation of haptic actuators. Such interaction is based on the notion of "haptic objects" that correspond to physical phenomena to be transmitted to the user. In the context of an immersive scene, a haptic object allows to provide a haptic effect by defining the stimulation of appropriate haptic actuators to mimic the physical phenomenon on the haptic rendering device. Different types of haptic actuators allow to restitute different types of haptic feedbacks.

An example of a haptic object is an explosion. An explosion can be rendered though vibrations and heat, thus combining different haptic effects on the user to improve the realism. An immersive scene typically comprises multiple haptic objects, for example using a first haptic object related to a global effect and a second haptic object related to a local effect.

The principles described herein apply to any immersive environment using haptics such as augmented reality, virtual reality, mixed reality or haptics-enhanced video (or omni-directional/360° video) rendering, for example, and more generally apply to any haptics-based user experience. A scene for such examples of immersive environments is thus considered an immersive scene.

Haptics refers to sense of touch and includes two dimensions, tactile and kinesthetic. The first one relates to tactile sensations such as friction, roughness, hardness, temperature and is felt through the mechanoreceptors of the skin (Merkel cell, Ruffini ending, Meissner corpuscle, Pacinian corpuscle). The second one is linked to the sensation of force/torque, position, motion/velocity provided by the muscles, tendons and the mechanoreceptors in the joints. Haptics is also involved in the perception of self-motion since it contributes to the proprioceptive system (i.e. perception of one's own body). Thus, the perception of acceleration, speed or any body model could be assimilated as a haptic effect. The frequency range is about 0-1 KHz depending on the type of modality. Most existing devices able to render haptic signals generate vibrations. Examples of such haptic actuators are linear resonant actuator (LRA), eccentric rotating mass (ERM), and voice-coil linear motor. These actuators may be integrated into haptic rendering devices such as haptic suits but also smartphones or game controllers.

To encode haptic signals, several formats have been defined related to either a high level description using XML-like formats (for example MPEG-V), parametric representation using json-like formats such as Apple Haptic Audio Pattern (AHAP) or Immersion Corporation's HAPT format, or waveform encoding (IEEE 1918.1.1 ongoing standardization for tactile and kinesthetic signals). The HAPT format has been recently included into the MPEG ISOBMFF file format specification (ISO/IEC 14496 part 12).

Moreover, GL Transmission Format (glTF™) is a royalty-free specification for the efficient transmission and loading of 3D scenes and models by applications. This format defines an extensible, common publishing format for 3D content tools and services that streamlines authoring workflows and enables interoperable use of content across the industry.

In addition, modern 3D engines are able to map textures to 3D objects. These textures contain information related to various appearance-related parameters such as the color of the object but also information on the geometry such as the normal maps or the bump maps that help modern visual rendering algorithms in the rendering process as well as more complex parameters such as diffuse, emissive, glossiness that also determine how to render the object.

Embodiments described hereafter have been designed with the foregoing in mind.

SUMMARY

Embodiments are about a haptic rendering device and corresponding rendering method that allow to render a haptic effect defined in a haptic signal comprising information representative of an immersive scene description. A corresponding syntax is proposed, defined as an extension to the glTF™ format.

A first aspect of at least one embodiment is directed to a signal for rendering an immersive scene comprising information representative of a scene description comprising at least one information representative of at least one element of the scene, and information representative of a haptic object, comprising a type of haptic effect, at least one parameter of the haptic effect, and a haptic volume or surface where the haptic effect is active.

A second aspect of at least one embodiment is directed to an apparatus comprising a processor configured to obtain information representative of a scene description comprising at least one information representative of at least one element of the scene, and information representative of a haptic object, comprising a type of haptic effect, at least one parameter of the haptic effect, and a haptic volume or surface where the haptic effect is active, detect a collision between a position of the user or of a body part of the user and the haptic volume, and prepare data for rendering the immersive scene, wherein the data is generated based on the at least one parameter of the haptic effect.

A third aspect of at least one embodiment is directed to a method comprising obtaining information representative of a scene description comprising at least one information representative of at least one element of the scene, and information representative of a haptic object, comprising a type of haptic effect, at least one parameter of the haptic effect, and a haptic volume or surface where the haptic effect is active, detecting a collision between a position of the user or of a body part of the user and the haptic volume, and preparing data for rendering the immersive scene, wherein the data is generated based on the at least one parameter of the haptic effect.

According to a fourth aspect of at least one embodiment, a computer program comprising program code instructions executable by a processor is presented, the computer program implementing at least the steps of a method according to the third aspect.

According to a fifth aspect of at least one embodiment, a computer program product which is stored on a non-transitory computer readable medium and comprises program code instructions executable by a processor is presented, the computer program product implementing at least the steps of a method according to the third aspect.

In variant embodiments, at least one parameter of the haptic effect is a haptic texture map.

BRIEF DESCRIPTION OF THE DRAWINGS

FIGS. 8A and 8B illustrate an example of a scene description representing a haptic object comprising haptic texture maps according to at least one embodiment.

DETAILED DESCRIPTION

Haptic objects may be related to the global environment, such as a breeze of wind, or to a local effect such as a punch in the chest. In the first case, a haptic effect is rendered for the complete immersive scene while in the latter case, the haptic effect is activated (thus, the effect is valid) only in a determined sub-space of the immersive scene, hereafter named haptic volume. The haptic volume can restrict to a 2D surface, typically the surface of an object or a simple 2D plane (a floor plane for example). In addition, some haptic rendering devices such as a haptic suit are able to provide localized haptic effects at a precise location on the user (e.g. a vibration on a chest).

Figure 1:
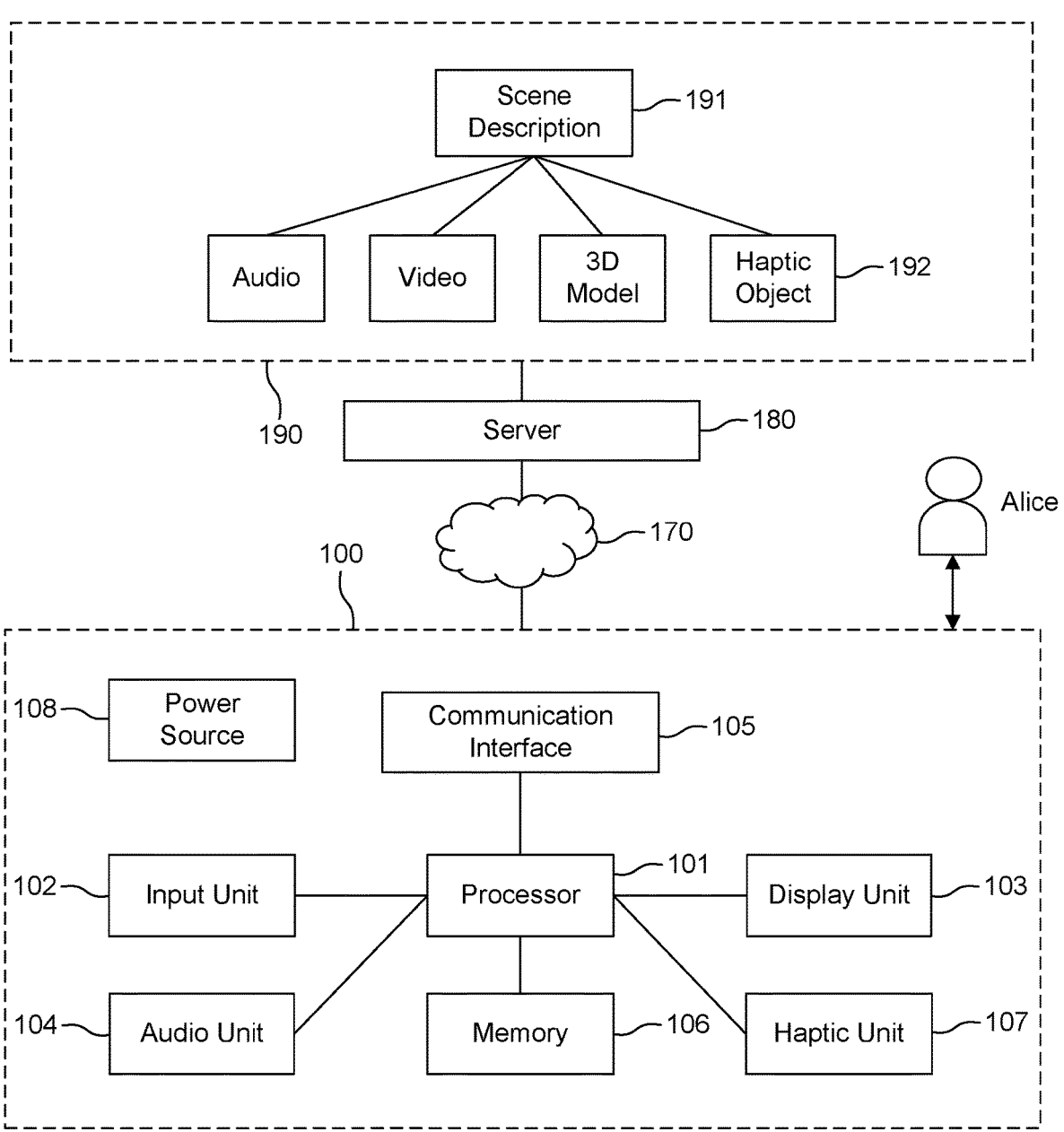
FIG. 1 illustrates a block diagram of an example of a system in which various aspects and embodiments are implemented.

FIG. 1 illustrates a block diagram of an example of system in which various aspects and embodiments are implemented. In the depicted immersive system, the user Alice uses the haptic rendering device 100 to interact with a server 180 hosting an immersive scene 190 through a communication network 170. This immersive scene 190 may comprise various data and/or files representing different elements (scene description 191, audio data, video data, 3D models, and haptic object 192) required for its rendering.

The haptic rendering device comprises a processor 101. The processor 101 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor may perform data processing such as haptic signal decoding, input/output processing, and/or any other functionality that enables the device to operate in an immersive system.

The processor 101 may be coupled to an input unit 102 configured to convey user interactions. Multiple types of inputs and modalities can be used for that purpose. Physical keypad or a touch sensitive surface are typical examples of input adapted to this usage although voice control could also be used. In addition, the input unit may also comprise a digital camera able to capture still pictures or video. The processor 101 may be coupled to a display unit 103 configured to output visual data to be displayed on a screen. Multiple types of displays can be used for that purpose such as a liquid crystal display (LCD) or organic light-emitting diode (OLED) display unit. The processor 101 may also be coupled to an audio unit 104 configured to render sound data to be converted into audio waves through an adapted transducer such as a loudspeaker for example. The processor 101 may be coupled to a communication interface 105 configured to exchange data with external devices. The communication preferably uses a wireless communication standard to provide mobility of the haptic rendering device, such as cellular (e.g. LTE) communications, Wi-Fi communications, and the like. The processor 101 may access information from, and store data in, the memory 106, that may comprise multiple types of memory including random access memory (RAM), read-only memory (ROM), a hard disk, a subscriber identity module (SIM) card, a memory stick, a secure digital (SD) memory card, any other type of memory storage device. In embodiments, the processor 101 may access information from, and store data in, memory that is not physically located on the device, such as on a server, a home computer, or another device.

The processor 101 may be coupled to a haptic unit 107 configured to provide haptic feedback to the user, the haptic feedback being described in a haptic object 192 that is part of a scene description 191 of an immersive scene 190. The haptic feedback 191 describes the kind of feedback to be provided according to the syntax described further herein-after. Such description file is typically conveyed from the server 180 to the haptic rendering device 100. The haptic unit 107 may comprise a single haptic actuator or a plurality of haptic actuators located at a plurality of positions on the haptic rendering device. Different haptic units may have a different number of actuators and/or the actuators may be positioned differently on the haptic rendering device.

The processor 101 may receive power from the power source 108 and may be configured to distribute and/or control the power to the other components in the device 100. The power source may be any suitable device for powering the device. As examples, the power source may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

While the figure depicts the processor 101 and the other elements 102 to 108 as separate components, it will be appreciated that these elements may be integrated together in an electronic package or chip. It will be appreciated that the haptic rendering device 100 may include any sub-combination of the elements described herein while remaining consistent with an embodiment. The processor 101 may further be coupled to other peripherals or units not depicted in FIG. 1 which may include one or more software and/or hardware modules that provide additional features, function-ality and/or wired or wireless connectivity. For example, the peripherals may include sensors such as a universal serial bus (USB) port, a vibration device, a television transceiver, a hands free headset, a Bluetooth® module, a frequency modulated (FM) radio unit, a digital music player, a media player, a video game player module, an Internet browser, and the like. For example, the processor 101 may be coupled to a localization unit configured to localize the haptic rendering device within its environment. The localization unit may integrate a GPS chipset providing longitude and latitude position regarding the current location of the haptic rendering device but also other motion sensors such as an accelerometer and/or an e-compass that provide localization services.

Typical examples of haptic rendering device 100 are haptic suits, smartphones, game controllers, haptic gloves, haptic chairs, haptic props, motion platforms, etc. However, any device or composition of devices that provides similar functionalities can be used as haptic rendering device 100 while still conforming with the principles of the disclosure.

In at least one embodiment, the device does not include a display unit but includes a haptic unit. In such embodiment, the device does not render the scene visually but only renders haptic effects. However, the device may prepare data for display so that another device, such as a screen, can perform the display. Example of such devices are haptic suits or motion platforms.

In at least one embodiment, the device does not include a haptic unit but includes a display unit. In such embodiment, the device does not render the haptic effect but only renders the scene visually. However, the device may prepare data for rendering the haptic effect so that another device, such as a haptic prop, can perform the haptic rendering. Examples of such devices are smartphones, head-mounted displays, or laptops.

In at least one embodiment, the device does not include a display unit nor does it includes a haptic unit. In such embodiment, the device does not visually render the scene and does not render the haptic effects. However, the device may prepare data for display so that another device, such as a screen, can perform the display and may prepare data for rendering the haptic effect so that another device, such as a haptic prop, can perform the haptic rendering. Examples of such devices are desktop computers, optical media players, or set-top boxes.

In at least one embodiment, the immersive scene 190 and associated elements are directly hosted in memory 106 of the haptic rendering device 100 allowing local rendering and interactions.

Although the different elements of the immersive scene 190 are depicted in FIG. 1 as separate elements, the prin-ciples described herein apply also in the case where these elements are directly integrated in the scene description and not separate elements. Any mix between two alternatives is also possible, with some of the elements integrated in the scene description and other elements are separate files.

Figures 2, 3:
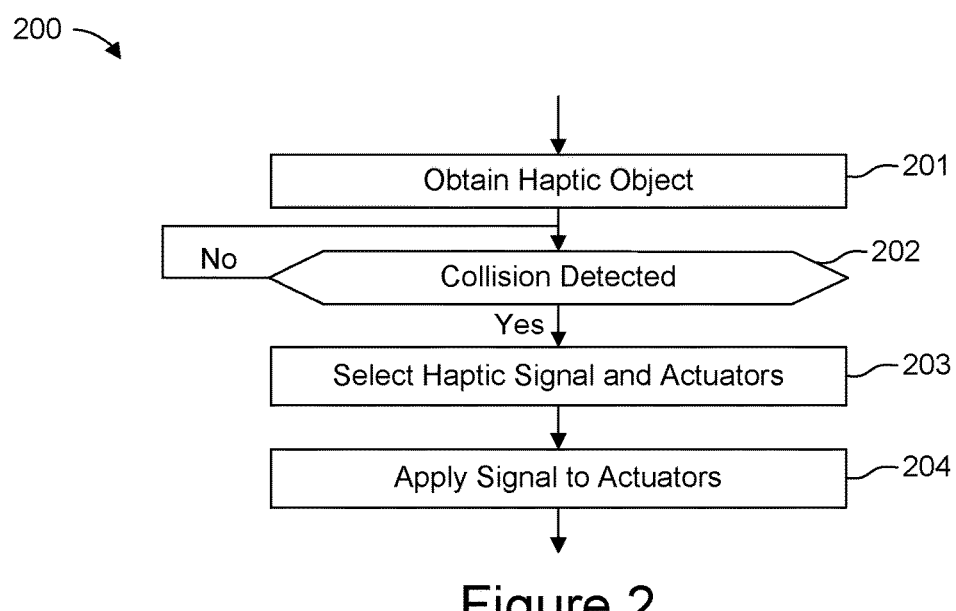
FIG. 2 illustrates an example flowchart of a process for rendering a haptic feedback description file according to at least one embodiment.
FIG. 3 illustrates an example of a data structure for an immersive scene description file comprising a haptic object according to at least one embodiment.

FIG. 2 illustrates an example flowchart of process for rendering a haptic feedback description file according to at least one embodiment. Such process 200 is typically imple-mented in a haptic rendering device 100 and executed by a processor 101 of such device. In step 201, the processor obtains a description of an immersive scene (191 in FIG. 1). This may be done for example by receiving it from a server through a communication network, by reading it from an external storage device or a local memory, or by any other means. The processor analyses the scene description file in order to extract the haptic object (192 in FIG. 1) that allows to determine the parameters related to the haptic effect and more particularly the haptic volume associated with the haptic effect. In step 202, the processor monitors a position of the user (or of a body part of the user for a more precise detection) within the immersive scene to detect an intersec-tion (object collision) with the haptic volume during the interaction. Collision detection may be performed for example by a dedicated physics engine specialized in this task. When such intersection is detected, in step 203, the processor extracts parameters from the haptic object allow-ing to select which haptic signal needs to be applied on which actuator or set of actuators. In step 204, the processor controls the haptic unit to apply the selected haptic signal to the haptic actuator or set of actuators and thus render the haptic feedback according to the information of the haptic object.

Although the haptic effect is described hereabove as being triggered by a collision, it may also be triggered by an event. Such event is for example relative to the overall immersive scene such as a rising sun (elevates the ambient tempera-ture), or an explosion (a vibration can simulate a shock-wave), or an incoming communication or other situations.

As discussed above, some devices do not perform the rendering themselves but delegate this task to other devices. In this case, data is prepared for the rendering of the visual element and/or of the haptic effect and transmitted to the device performing the rendering.

In a first example, the immersive scene 191 may comprise a virtual environment of an outdoor camp site where the user can move an avatar representing him. A first haptic feedback could be a breeze of wind that would be present anywhere in the virtual environment and generated by a fan. A second haptic feedback could be a temperature of 30° C. when the avatar is in proximity of a campfire. This effect would be rendered by a heating element of a haptic suit worn by the user executing the process 200. However, this second feed-back would only be active when the position of the user is detected as being inside the haptic volume of the second haptic object. In this case the haptic volume represents the distance to the fire where the user feels the temperature.

In another example, the immersive scene 191 may com-prise a video of a fight between two boxers and, the user wearing a haptic suit, the haptic effect may be a strong vibration on the chest of the user when one of the wrestler receives a punch.

FIG. 3 illustrates an example of data structure of an immersive scene according to at least one embodiment. This embodiment is based on the glTF™ file format. The core of glTF™ is a JSON file that describes the structure and composition of a scene containing 3D models. The figure shows the relationship between the elements composing this structure. In this context, a scene 300 is the top level element gathering all the other elements. Most notably, it comprises an array of nodes. Each node 301 can contain child nodes allowing to create a hierarchy. A node may refer to a mesh or camera or skin and a local geometrical transform may be associated with the node. A mesh 310 corresponds to the geometry data required to render the mesh. A skin 320 is used to perform vertex skinning to let vertices of a mesh be influenced by the bones of a skeleton based on its pose. A camera 325 determines a projection matrix. An animation 340 may be applied to the properties of a node. Buffers 355 contain the data used for the geometry of 3D models, animations and skinning. BufferViews 350 add structural information to the buffer data, while accessor 345 define the exact type and layout of BufferViews. Material 360 determines how an object should be rendered based on physical material properties. Texture 365 allows to define the appearance of an object. Images 370 define the image data used for a texture while a sampler 380 describes the wrapping and scaling of textures. All these elements of a glTF™ file allow to define a conventional immersive scene with any haptic feedback.

Therefore, in at least one embodiment, the glTF™ file further comprises a haptic object 330 that describes a haptic feedback to be rendered. In a variant embodiment, the haptic object comprises a haptic texture map 335 whose data may be stored along with the other textures 365. Such haptic objects are described herein.

Figure 4:
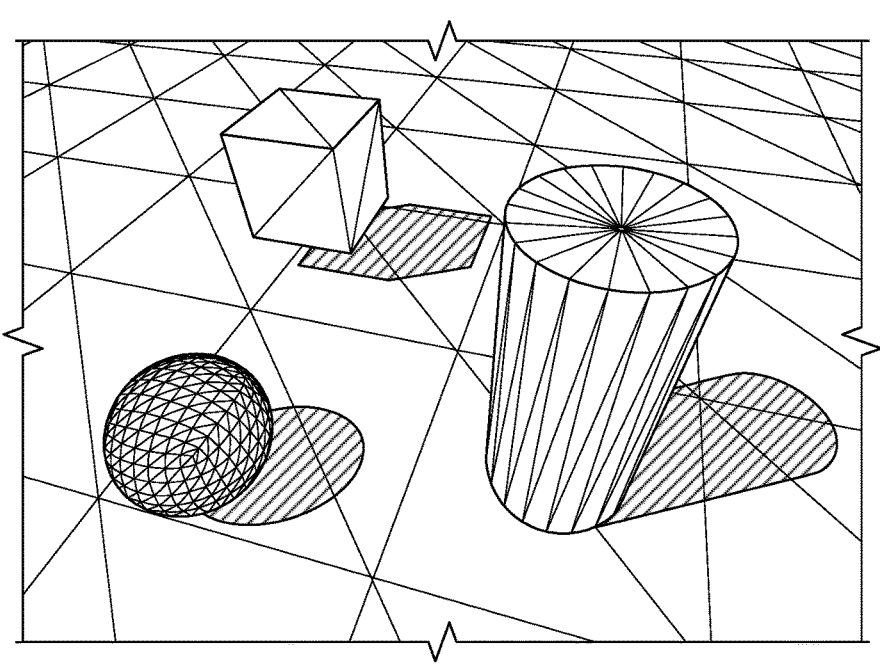
FIG. 4 illustrates an example of a 3D scene with haptic objects.

FIG. 4 illustrates an example of a 3D scene with haptic objects. Each volume is a zone in which a user may feel a corresponding effect. In one example, the sphere corresponds to a vibration at 378 Hz and the cube corresponds to a pressure effect of 10 Newton. This is the kind of information that needs to be stored in the haptic object as part of the immersive scene description. At runtime, the user navigates within the immersive scene through his device 100 of FIG. 1. Depending on the kind of immersive application, the navigation may correspond to different types of navigation. In the example of virtual reality, the navigation is related to movements of an avatar (e.g. a 3D object) representing the user within the immersive scene and being under control of the user. In the example of augmented reality application, the navigation is related to physical movements of the user in the real world, tracked by a localization system to determine a corresponding position of the user within the immersive scene. In the example of an omnidirectional video, the navigation is related to the point of view of the user within the 360° space.

During the navigation within the immersive scene, collisions may occur with haptic objects when the position of the user (or its avatar) and the haptic volume of a haptic object are colliding, or in other words, when the position of the user is within the boundaries of the haptic volume. In such situation, the corresponding haptic effect is triggered on the haptic rendering device. In the example of FIG. 4, when the user enters in collision with the sphere, the haptic rendering device will render a vibration at the frequency of 378 Hz until there is no more collision.

However, the haptic object does not necessarily correspond to a visible 3D object. Thus it can be associated to a volume (a haptic volume) without any visible representation so that the collision happens when the position of the user is 'inside' the volume.

Thus, in at least one embodiment, an immersive scene comprises at least one haptic object characterized by a type of haptic effect, an information characterizing the haptic signal to be applied, and an information representing a volume within the scene where the haptic effect is valid and where it should be applied by a haptic rendering device. In one variant embodiment, the information characterizing the haptic signal is a reference to a file comprising the haptic signal. In one variant embodiment, the haptic volume is the whole immersive scene so that the haptic effect is global and independent of the position of the user. In one variant embodiment, the haptic volume corresponds to the geometry of the virtual object with which the haptic object is associated.

Figure 5:
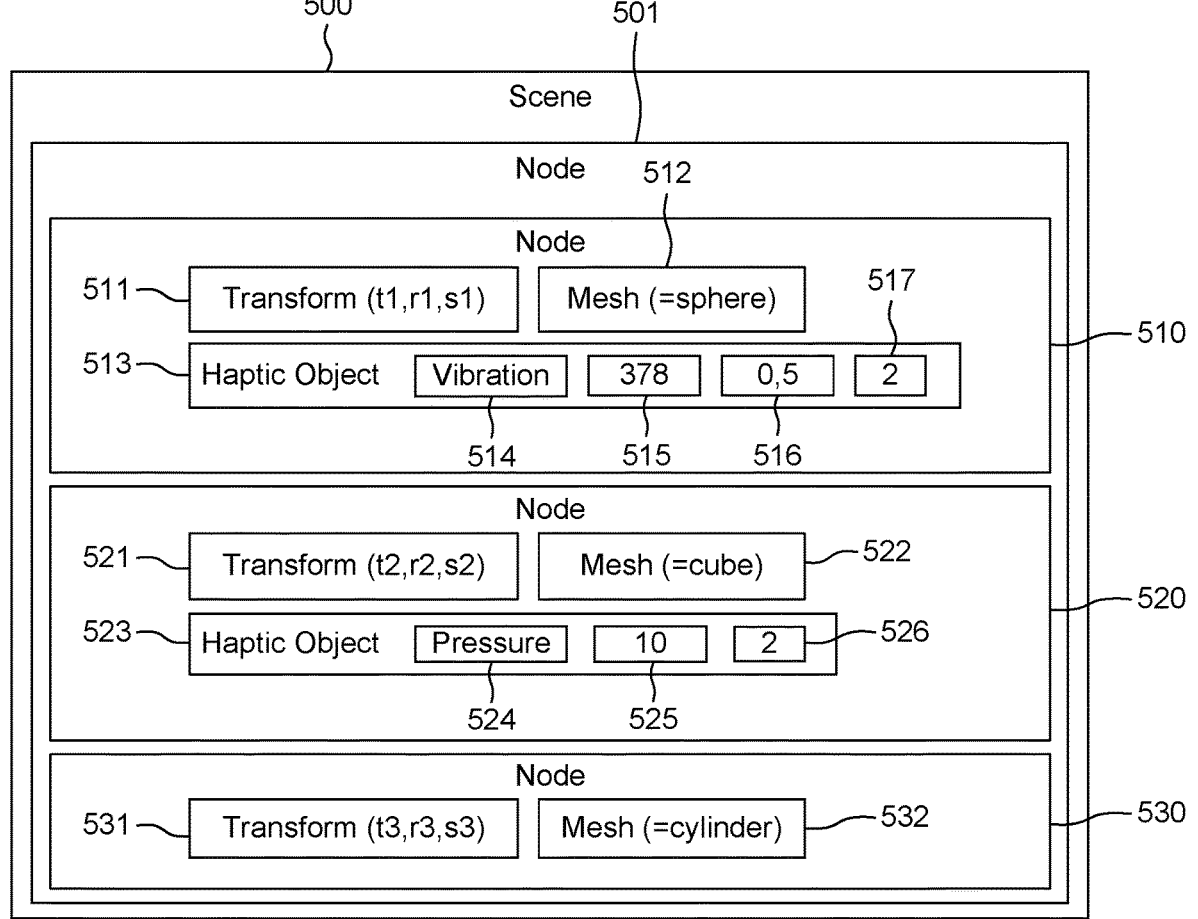
FIG. 5 illustrates an example of a data structure based on glTF™ corresponding to the scene of FIG. 4 according to at least one embodiment.

FIG. 5 illustrates an example of a data structure based on glTF™ corresponding to the scene of FIG. 4 according to at least one embodiment. The scene 500 comprises a top-level node 501 that comprises three child nodes 510, 520 and 530. The first child node 510 corresponds to the sphere object at the bottom left of FIG. 4. The node 510 comprises transform parameters 511 defining a translation t1, a rotation r1 and a scaling s1 of the node, a mesh 512 that comprises the complete geometry of the sphere object (i.e. the set of vertices and surfaces). The node 510 also comprises a haptic object 513 whose type 514 is determined as being a vibration with a frequency 515 of 378 hertz and an intensity 516 of 0.5. The shape 517 of the haptic object refers to the shape of the node and thus will use the geometry defined by the mesh 512 that defines a sphere. Thus, the haptic effect of haptic object 513 will be active within the volume of this sphere. The second child node 520 corresponds to the cube object at the top of FIG. 4. The node 520 comprises transform parameters 521 defining a translation t2, a rotation r2 and a scaling s2 of the node, a mesh 522 that comprises the complete geometry of the cube object (i.e. the set of vertices and surfaces). The node 520 also comprises a haptic object 523 whose type 524 is determined as being a pressure with a value 525 of 10. The shape 526 of the haptic object refers to the shape of the node 520 and thus will use the geometry defined by the mesh 522 that defines a cube. Thus, the haptic effect of haptic object 523 will be active within the volume of this cube. The third child node 530 corresponds to the cylinder object at the bottom-right of FIG. 4. This node does not contain any haptic object and thus will have no associated haptic effect.

Table 1 illustrates an example of a syntax for defining a haptic object according to at least one embodiment. More particularly, the figure shows the JSON syntax based on the extension mechanism of glTF™. The extension for haptic objects designed according at least one embodiment is identified as "IDCC_Haptics" in this example of syntax. The list of haptic effects in the figure comprises vibration, pressure and temperature effects but is not exhaustive. Other types of haptic effects may be defined based on the same principles (wind, rain, snow, electricity, or any combination between effects). Table 11 and 12 respectively describe the syntax for pressure and temperature effects. The syntax for describing a haptic effect is defined in a specific JSON schema (some examples below) that is then instantiated in the "properties" of a node in the scene description file as described below. A "shapeType" is also associated to the haptic object and allows to describe the haptic volume. It may either be a primitive volume (sphere or cube) scaled according to the scale properties of the node (thus allowing ellipsoid or parallelepiped volumes) or may be defined as a custom mesh. In the latter case, the custom mesh is defined by the existing mesh property of the node and corresponds to the geometry of the visible object. Defining one of the primitive volumes allows to determine a haptic volume independently of any visible element.

TABLE 1

```
{
    "$schema": "http://json-schema.org/draft-04/schema",
    "title": "IDCC_Haptics",
    "type": "object",
    "description": "A haptic object.",
    "allOf": [ { "$ref": "glTFChildOfRootProperty.schema.json" } ],
    "properties": {
        "vibration": {
            "type": "object",
            "$ref": "IDCC_haptics.vibration.schema.json"
        },
        "pressure": {
            "type": "object",
            "$ref": "IDCC_haptics.pressure.schema.json"
        },
        "temperature": {
            "type": "object",
            "$ref": "IDCC_haptics.temperature.schema.json"
        },
        "shapeType": {
            "type": "int",
            "description": "Specifies the shape of the haptic volume.",
            "anyOf": [
                {
                    "enum": [ 0 ],
                    "Sphere": "Sphere-like volume containing the haptic
effect. Diameter of the sphere is given by the scale of the object."
                },
                {
                    "enum": [ 1 ],
                    "Cube": "Cube-like volume containing the haptic effect.
Shape of the cube is given by the scale of the object."
                },
                {
                    "enum": [ 2 ],
                    "Custom": "Custom volume containing the haptic effect.
The volume is defined by the mesh associated to the node."
                },
                {
                    "type": "int"
                }
            ]
        },
        "name": { },
        "extensions": { },
        "extras": { }
    },
    "required": [
        "shapeType"
    ]
}
```

In at least one embodiment, in addition to sphere and cube primitive volumes, additional volumes conventionally used by 3D physics engines may be used such as a 2D plane, an ellipsoid, a parallelepiped or a capsule (a capsule is made of two half-spheres Joined together by a cylinder) for example. The syntax is not illustrated in the figure but would comprise adding the additional primitive volumes in additional enumeration values and additional parameters for defining these conventional shapes.

Usually, a single effect is defined, but multiple effects could be present and combined. For instance, pressure and temperature may be combined to represent weather conditions (cold rain).

Table 2 illustrates an example of a syntax based on glTF™ for defining a vibration haptic effect according to at least one embodiment.

TABLE 2

```
{
    "$schema": "http://json-schema.org/draft-04/schema",
    "title": "IDCC_haptics/vibration",
    "type": "object",
    "allOf": [ { "$ref": "glTFProperty.schema.json" } ],
    "properties": {
        "frequency": {
            "type": "number",
            "description": "Frequency of the sine signals.",
            "minimum": 0.0,
            "default": 250.0
        },
        "intensity": {
            "type": "number",
            "description": "Intensity of the sine signals.",
            "minimum": 0.0,
            "maximum": 1.0,
            "default": 0.5
        },
        "index": {
            "allOf": [ { "$ref": "glTFid.schema.json" } ],
            "description": "The index of an accessor containing the data.",
            "gltf_detailedDescription": "The index of an accessor containing
the data. That accessor must have componentType 'FLOAT' and must
respect the WAV format. Ignored if file exists."
        },
        "extensions": { },
        "extras": { }
    }
}
```

A vibration haptic effect can be defined either according to parameters comprising a frequency (vibration at a constant frequency of a sine signal) and intensity (amplitude of the vibration) or, when a more complex effect is desired, according to a haptic signal (waveform similar to an audio signal). In the first case, the parameters of the effects can be directly defined within the vibration syntax as shown in the figure and carried by the "frequency" and "intensity" syntax elements. In the second case, the effect is determined according to a signal defined by data embedded into a glTF™ buffer corresponding to an accessor index. Such data is typically loaded from an external file such as a waveform audio file ('.wav' format) or a haptic file format ('OHM' format) or any other file format adapted to carry a vibration signal. Default values may be determined and should be used when the corresponding syntax element is not present. For example, the default value for a vibration effect according to the definition of FIG. 7 is to vibrate at a frequency of 250 Hz at half intensity.

Table 3 illustrates an example of a definition of a scene comprising a vibrating teapot according to at least one embodiment. This example shows how to define a simple scene comprising a 3D object associated to a vibration effect.

TABLE 2

```
{
    "extensionsUsed": ["IDCC_Haptics"],
    "accessors": [
        {
            "bufferView": 0,
            "componentType": 5126, "count": 3245, "type": "VEC3",
            "max": [3.5, 3.0, 2.0], "min": [-3.0, 0.0, -2.0]
        },
        {
            "bufferView": 1,
```

TABLE 2-continued

```
        "componentType": 5126, "count": 3245, "type": "VEC3",
        "max": [1.0, 1.0, 1.0], "min": [−1.0, −1.0, −1.0]
    },
    {
        "bufferView": 2,
        "componentType": 5126, "count": 3245, "type": "VEC4",
        "max": [ −1.0, 0.0, 0.0, 1.0 ], "min": [ −1.0, 0.0, 0.0, 1.0 ]
    },
    {
        "bufferView": 3,
        "componentType": 5123, "count": 18960, "type": "SCALAR",
        "max": [ 3244.0 ], "min": [ 0.0 ]
    }
],
"asset": {
    "version": "2.0"
},
"buffers": [
    {
        "uri": "teapot.bin",
        "byteLength": 167720
    }
],
"bufferViews": [
    { "buffer": 0, "byteLength": 38940 },
    { "buffer": 0, "byteOffset": 38940, "byteLength": 38940 },
    { "buffer": 0, "byteOffset": 77880, "byteLength": 51920 },
    { "buffer": 0, "byteOffset": 129800, "byteLength": 37920 }
],
"materials": [
    {
        "pbrMetallicRoughness": {
            "baseColorFactor": [ 0.8, 0.8, 0.8, 1.0 ], "metallicFactor": 0.0
        },
        "name": "defaultMat"
    }
],
"meshes": [
    {
        "primitives": [
            {
                "attributes": {
                    "POSITION": 0,
                    "NORMAL": 1,
                    "TANGENT": 2
                },
                "indices": 3,
                "material": 0
            }
        ],
        "name": "teapot"
    }
],
"nodes": [
    {
        "children": [
            1
        ],
        "mesh": 0,
        "translation": [−2.0, −2.0, 3.0 ],
        "name": "teapot"
    },
    {
        "name": "Vibration Object",
        "extensions": {
            "IDCC_Haptics": {
                "shapeType": 2,
                "vibration": {
                    "frequency": 250.0,
                    "intensity": 0.7
                }
            }
        }
    }
],
"scene": 0,
"scenes": [
    {
        "nodes": [
            0
```

TABLE 2-continued

```
    ],
    "name": "teapot"
    }
]
}
```

In this example, the scene comprises a single node named "teapot" representing the unique 3D object of the scene. The geometry of this node is loaded from a "teapot.bin" file through a set of bufferViews. The material defines how the mesh is represented and translation defines the position of the object within the virtual environment. A haptic object is also associated to this node. This haptic object corresponds to a vibration effect ("vibration" syntax element) at a frequency of 250 Hz ("frequency" syntax element) with an intensity of 70% ("intensity" syntax element). The haptic volume is defined as being the mesh of the node ("shapeType" syntax element=2) thus, the mesh of the teapot. Therefore, when such an object is present in an immersive scene, a vibration will be rendered when the user's position collides with the geometry of the teapot, in other words when the user "touches" the teapot.

Table 4 illustrates an example of a definition of a scene comprising a haptic object and associated haptic volume according to at least one embodiment.

TABLE 4

```
{
    "extensionsUsed": [ "IDCC_Haptics" ],
    "asset": {"version": "2.0"},
    "buffers": [{ "uri": "haptic_loader.bin", "byteLength": 0 } ],
    "nodes": [
        {
            "scale": [ 1.2, 1.2, 1.2 ],
            "translation": [ −1.8, 0.7, −0.7 ],
            "name": "VibrationObject",
            "extensions": {
                "IDCC_Haptics": {
                    "shapeType": 0,
                    "vibration": {
                        "frequency": 378.0,
                        "intensity": 0.5
        }}}},
        }
            "translation": [ −2.9, 0.0, 0.0 ],
            "name": "Pressure Object",
            "extensions": {
                "IDCC_Haptics": {
                    "shapeType": 1,
                    "pressure": {
                        "value": 10.0
        }}}}
    ],
    "scene": 0,
    "scenes": [ { "nodes": [ 0, 1 ], "name": "haptic_example" } ]
}
```

As mentioned earlier, a haptic volume is not necessarily visible. For the sake of compacity and simplicity, this example does not comprise the definition of other nodes comprising other objects not related to the haptic volume and only comprises two haptic effects with invisible haptic volumes. The scene comprises a single node named "haptic_example". It indicates the use of the "IDCC_haptics" extension, the version (2.0) of the glTF™ Specification and no buffer is used for loading resources. The first haptic effect is a vibration haptic object configured to vibrate at frequency 378 Hz and half (0.5) intensity. This effect is not associated to a visible object but to an invisible haptic volume being a cube located at a position p=(−1.8, 0.7, −0.7) and of size 1.2.

The second haptic effect is a pressure haptic object configure to apply a force of 10 newton. This effect is not associated to a visible object but to an invisible haptic volume being a sphere located at a position p'=(−2.9, 0.0, 0.0) and of size 1.0 (default value since not specified).

In one embodiment, a haptic object is associated to a mesh-based virtual object but is configured with a volume that is greater than the volume defined by the mesh. For example, the virtual object may correspond to a fireplace represented by a mesh with texture and animations, and the haptic object may comprise a temperature haptic effect configured with a haptic volume of a sphere greater than the bounding box of the fireplace mesh. With such configuration, the user approaching the virtual fireplace is able to feel the heat before coming into contact (collision) with the fireplace.

In one embodiment, a scene comprises multiple overlapping haptic objects having concentric volumes with different haptic effects. For example, a set of haptic objects may use concentric spheres located around the fireplace, the volumes having decreasing sizes with increasing temperature values. Using this technique, the user would feel a progressive heat increase when approaching the fireplace. Since the user is going to collide with multiple spheres, the smallest (i.e. the closest one to the fire) will be selected.

Table 5 illustrates an example of allowing a progressive effect for a vibration haptic effect according to at least one embodiment. Indeed, rather than defining multiple overlapping haptic objects, in one embodiment, an interpolation between a minimal value and a maximal value over the span of the haptic volume is proposed. The figure shows only the syntax elements added to the definition of a vibration haptic effect according to table 2. First, an "interpolation" flag syntax element is added to the definition of the vibration haptic effect. This flag allows to request the value of the haptic effect to be interpolated and determines how to perform the interpolation. The interpolation may be any linear, exponential, or non-linear function. Secondly, "min" and "max" syntax elements allow to define the range of the interpolation by defining scaling factors to be applied to the expected value.

TABLE 5

```
...
"interpolation": {
    "type": "int",
    "description": "Indicates interpolation in the volume.",
    "anyOf": [
        { "enum" [ 0 ], "off": "no interpolation."},
        { "enum" [ 1 ], "linear": "linear interpolation."},
        {    "enum"    [   2    ],    "exponential":    "exponential
        interpolation."}
    ]
    "default": 0,
},
"min": {
    "type": "number",
    "description": "Minimum interpolation value.",
    "minimum": 0.0,
    "maximum": 1.0,
    "default": 0.2,
},
"max ": {
    "type": "number",
    "description": " Maximum interpolation value.",
    "minimum": 0.0,
    "maximum": 1.0,
    "default": 1.0,
},
...
```

Table 6 illustrates an example of a vibration haptic effect using interpolation.

TABLE 6

```
"nodes": [
    {
        "scale": [ 2.0, 2.0, 2.0 ],
        "name": "VibrationObject",
        "extensions": {
            "IDCC_Haptics": {
                "shapeType": 1,
                "vibration": {
                    "frequency": 440.0,
                    "intensity": 1.0,
                    "interpolation": 1
                    "min": 0.4
    }}}},
]
```

In this example, the haptic volume is a cube of size 2.0 positioned at the origin of the virtual environment. The haptic effect is to be interpolated linearly between 0.4 and 1.0, or more exactly between 0.4×1.0 (the first value being the "min" scaling value of the "interpolation" and the second value being the "intensity") and 1.0×1.0 (the first value being the default "max" scaling value of the "interpolation" and the second value being the "intensity"). The interpolation is done according to the distance to the center of the haptic volume. Therefore, at the origin, the haptic effect intensity will be 0.4. At the center of the cube, at a position equal to (1.0, 1.0, 1.0), the intensity will be 0.4. At the position equal to (0.5, 0.5, 0.5), the intensity will be 0.7.

In at least one embodiment, the type of interpolation is defined by a parameter of the haptic object allowing to select at least between linear and custom. In the latter case, the function is determined in additional parameters.

Table 7 illustrates an example of a syntax based on glTF™ for the vibration haptic effect according to at least one embodiment using a haptic signal stored in a file.

TABLE 7

```
{
    "$schema" : "http://json-schema.org/draft-04/schema",
    "title" : "IDCC_haptics/vibration",
    "type" : "object",
    "allOf": [ { "$ref": "glTFProperty.schema.json" } ],
    "properties" : {
        "frequency": {
            "type": "number",
            "description": "Frequency of the sine signals.",
            "minimum": 0.0,
            "default": 250.0
        },
        "intensity": {
            "type": "number",
            "description": "Intensity of the sine signals.",
            "minimum": 0.0,
            "maximum": 1.0,
            "default": 0.5
        },
        "file": {
            "type": "string",
            "description" : "data file containing the signal (OHM, wav, etc) ",
            "default" : ""
        },
        "index": {
            "allOf": [ { "$ref": "glTFid.schema.json" } ],
            "description": "The index of an accessor containing the data.",
            "gltf_detailedDescription": "The index of an accessor containing
            the data. That accessor must have componentType 'FLOAT' and must
            respect the WAV format. Ignored if file exists."
```

TABLE 7-continued

```
    },
    "extensions": { },
    "extras": { }
  }
}
```

This embodiment builds on the example syntax illustrated in table 2 for a vibration haptic effect and adds a reference to a file storing the haptic signal to be applied to render the effect. This allows to define a more sophisticated haptic effect than simply using a sine signal at fixed frequency. In addition, the intensity parameter may also apply to the haptic signal. This allows to share a unique haptic signal file and apply it at different levels of intensity in different haptic objects. In an example using haptic objects with concentric volumes, the haptic objects could share the same haptic signal file and have increasing intensity to provide a progressive effect. The file format is adapted for storing a haptic signal. Example of formats for such use are Waveform audio (WAV), Object Haptic Metadata (OHM), Apple Haptic Audio Pattern (AHAP) or Immersion Corporation's HAPT format. The same principle applies similarly to the other types of haptic effect.

Table 8 illustrates an example of a syntax based on glTF™ for the vibration haptic effect that defines the location of effect according to at least one embodiment. This embodiment builds upon the Object Haptic Metadata (OHM) format and targets applying a haptic effect at a defined location of the user's body.

TABLE 8

```
{
  "$schema" : "http://json-schema.org/draft-04/schema",
  "title" : "IDCC_haptics/vibration",
  "type" : "object",
  "allOf": [ { "$ref": "glTFProperty.schema.json" } ],
  "properties" : {
    "frequency": {
      "type": "number",
      "description": "Frequency of the sine signals.",
      "minimum": 0.0,
      "default": 250.0
    },
    "intensity": {
      "type": "number",
      "description": "Intensity of the sine signals.",
      "minimum": 0.0,
      "maximum": 1.0,
      "default": 0.5
    },
    "file": {
      "type": "string",
      "description" : "data file containing the signal (OHM, wav, etc)",
      "default" ; ""
    },
    "index": {
      "allOf": [ { "$ref": "glTFid.schema.json" } ],
      "description": "The index of an accessor containing the data.",
      "gltf_detailedDescription": "The index of an accessor containing
the data. That accessor must have componentType 'FLOAT' and must
respect the WAV format. Ignored if file exists."
    },
    "avatar_id": {
      "type": "integer",
      "description": "ID of the body model",
      "minimum": 0.0,
      "default": 1.0
    },
    "body_part_mask": {
      "type": "integer",
      "description": "binary mask specifying body parts on which to
apply the effect",
```

TABLE 8-continued

```
      "minimum": 0.0,
      "default": 0.0
    },
    "vertices": {
      "allOf": [ { "$ref": "glTFid.schema.json" } ],
      "description": "The index of an accessor containing the vertices
to stimulate.",
      "gltf_detailedDescription": "The index of an accessor containing
the vertices to stimulate.The accessor is a list of vertices id."
    },
    "extensions": { },
    "extras": { }
  }
}
```

Therefore, it is proposed, in at least one embodiment, to add syntax elements allowing to specify where the effect should be applied to the syntax proposed above. This may be done in two steps. Firstly, by determining a geometric model representing the spatial acuity of the haptic perception (in other words a body model) and secondly by determining the location where the haptic effect should be applied on the body model. The geometric model may be selected either as a generic model chosen from a set of standard predetermined models. In this case, the model is based on a mesh of a human body. The geometric model may also be determined as a custom geometric model by specifying its geometry. This allows to adapt to non-standard haptic rendering devices, such as a haptic chair for example. In this case, the spatial acuity of the haptic perception is limited by the precise location of the actuators on the rendering device. In the proposed syntax, the geometric model is identified by an "avatar_ID". The location where the effect should be applied is chosen either by using the "body_part_mask" syntax element that corresponds to a binary mask that specifies body parts that determine a set of associated vertices or by using the "vertices" syntax element that specifies the vertices that should be stimulated.

Table 9 illustrates an example of a syntax based on glTF™ for defining a geometric model when using a vibration haptic effect that defines the location of effect according to at least one embodiment. This syntax defines an identifier "id" of the geometric model, a "lod" value specifying the level of details (thus the resolution) of the geometric model, and the "type" of haptic effect to be rendered. Thus, it allows to specify the exact location where to apply the haptic effect.

TABLE 9

```
{
  "$schema": "http://json-schema.org/draft-04/schema",
  "title": "IDCC_Haptics/avatar",
  "type": "object",
  "description": "A haptic object.",
  "allOf": [ { "$ref": "glTFChildOfRootProperty.schema.json" } ],
  "properties": {
    "id": {
      "type": "number",
      "description": "ID for the avatar description (one may have one
mesh resolution per type of haptic signal).",
      "minimum": 0.0,
      "default": 0.0
    },
    "lod": {
      "type": "int",
      "description": "Number specifying the level of details of the
avatar: 0, 1 or 2 for respectively low, average and high resolution. It
allows to use more or less complex representations.",
      "anyOf": [
        {  "enum": [ 0 ],
           "Low": "low-level lod representation." },
```

TABLE 9-continued

```
            {   "enum": [ 1 ],
                "Average": "average-level lod representation." },
            {   "enum": [ 2 ],
                "High": "high-level lod representation." },
            {   "type": "int" }
        ]
    {
    "type": {
        "type": "int",
        "description": "Specifies the type of haptic perception
represented by the avatar. It refers to a generic model except for Custom
(3) where the mesh is provided in the gltf buffer of this node",
        "anyOf": [
            {   "enum": [ 0 ],
                "Vibration": "Human body model representing vibration
spatial acuity." },
            {   "enum": [ 1 ],
                "Pressure":   "Human body model representing pressure
spatial acuity." },
            {   "enum": [ 2 ],
                "Temperature":       "Human  body  model  representing
temperature spatial acuity.." },
            {   "enum": [ 3 ],
                "Custom": "Custom human body model. Mesh is provided
in the gltf buffer." },
            { "type": "int" }
        ]
    },
    "name": { }, "extensions": { }, "extras": { }
    },
    "required": [ "type", "lod", "id" ]
}
```

Table 10 illustrates an example of a syntax based on glTF™ for the vibration haptic effect using channels carrying the haptic signals according to at least one embodiment. This embodiment adds to the syntax proposed above the notion of channels. Indeed, a waveform audio or OHM file may comprise multiple channels for carrying multiple haptic signals associated to multiple haptic objects. In this case, the syntax further comprises information representative of the channel to be used.

TABLE 10

```
{
    "$schema" : "http://json-schema.org/draft-04/schema",
    "title" : "IDCC_haptics/vibration",
    "type" : "object",
    "allOf": [ { "$ref": "glTFProperty.schema.json" } ],
    "properties" : {
        "frequency": {
            "type": "number",
            "description": "Frequency of the sine signals.",
            "minimum": 0.0,
            "default": 250.0
        },
        "intensity": {
            "type": "number".
            "description": "Intensity of the sine signals.",
            "minimum": 0.0,
            "maximum": 1.0,
            "default": 0.5
        },
        "file": {
            "type": "string",
            "description" : "data file containing the signal (OHM, wav, etc)",
            "default" : ""
        },
        "channels": {
            "type": "integer",
            "description": "Number of channels of the WAV data in the gltf
buffer.",
```

TABLE 10-continued

```
        "minimum": 0,
        "default": 1
    },
    "index": {
        "allOf": [ { "$ref": "glTFid.schema.json" } ],
        "description": "The index of an accessor containing the data.",
        "gltf_detailedDescription": "The index of an accessor containing
the data. That accessor must have componentType 'FLOAT' and must
respect the WAV format. Ignored if file exists.
    },
    "avatar_id": {
        "type": "array",
        "description": "IDs of the body models. One per channel",
        "items": {
            "type": "integer",
            "minimum": 0.0,
        },
        "minItems": 0,
    },
    "body_part_mask": {
        "type": "array",
        "description": "binary mask specifying body parts on which to
apply the effect. One per channel",
        "items": {
            "type": "integer",
            "minimum": 0.0,
        },
        "minItems": 0
    },
    "vertices": {
        "type": "array",
        "description": "The index of an accessor containing the vertices
to stimulate. One per channel",
        "items": {
            "$ref": "glTFid.schema.json" }
        },
        "uniqueItems": true,
        "minItems": 1,
        "gltf_detailedDescription": "The index of an accessor containing
the vertices to stimulate. One per channel. The accessor is a list of
vertices id."
    },
    "extensions": { },
    "extras": { }
    }
}
```

Table 11 illustrates an example of a syntax based on glTF™ for the pressure haptic effect according to at least one embodiment. A pressure haptic effect can be defined simply by a numeric pressure value expressed in Newton in a "value" syntax element. A default value of "0.0" corresponding to no pressure should be used if the "value" syntax element is not present. All embodiments presented above in the context of the vibration haptic effect apply similarly to the pressure haptic effect.

TABLE 11

```
{
  "$schema" : "http://json-schema.org/draft-04/schema",
  "title" : "IDCC_haptics/pressure",
  "type" : "object",
  "allOf": [ { "$ref": "glTFProperty.schema.json" } ],
  "properties" : {
    "value": {
      "type": "number",
      "description": "Pressure value in Newton.",
      "minimum": 0.0,
      "default": 0.0
    },
    "index": {
      "allOf": [ { "$ref": "glTFid.schema.json" } ],
      "description": "The index of an accessor containing the data.",
      "gltf_detailedDescription": "The index of an accessor containing
the data. That accessor must have componentType 'FLOAT' and must respect the
WAV format. Ignored if file exists."
    },
    "extensions": { },
    "extras": { }
  }
}
```

Table 12 illustrates an example of a syntax based on glTF™ for the temperature haptic effect according to at least one embodiment. A temperature haptic effect can be defined simply by a numeric temperature value expressed in Celsius degrees in a "value" syntax element. A default value of "20.0" corresponding to no pressure should be used if the "value" syntax element is not present. All embodiments presented above in the context of the vibration haptic effect apply similarly to the temperature haptic effect.

allow the user to feel the shape of the bottle and its different components from the geometry description.

According to an embodiment, this rendering is enhanced by the use of haptic texture maps to describe the haptic properties of the object. Haptic texture maps allow to simulate different harshness and temperature of the bottle of FIG. 6A by defining different parameters for different haptic properties of specific areas of the 3D object. For example, the metallic bottle 1710 is rendered as a hard and cold

TABLE 12

```
{
  "$schema" : "http://json-schema.org/draft-04/schema",
  "title" : "IDCC_haptics/temperature",
  "type" : "object",
  "allOf": [ { "$ref": "glTFProperty.schema.json" } ],
  "properties" : {
    "value": {
      "type": "number",
      "description": "Temperature in °C.",
      "minimum": 0.0,
      "default": 20.0
    },
    "index": {
      "allOf": [ { "$ref": "glTFid.schema.json" } ],
      "description": "The index of an accessor containing the data.",
      "gltf_detailedDescription": "The index of an accessor containing
the data. That accessor must have componentType 'FLOAT' and must respect the
WAV format. Ignored if file exists."
    },
    "extensions": { },
    "extras": { }
  }
}
```

Figure 6A:
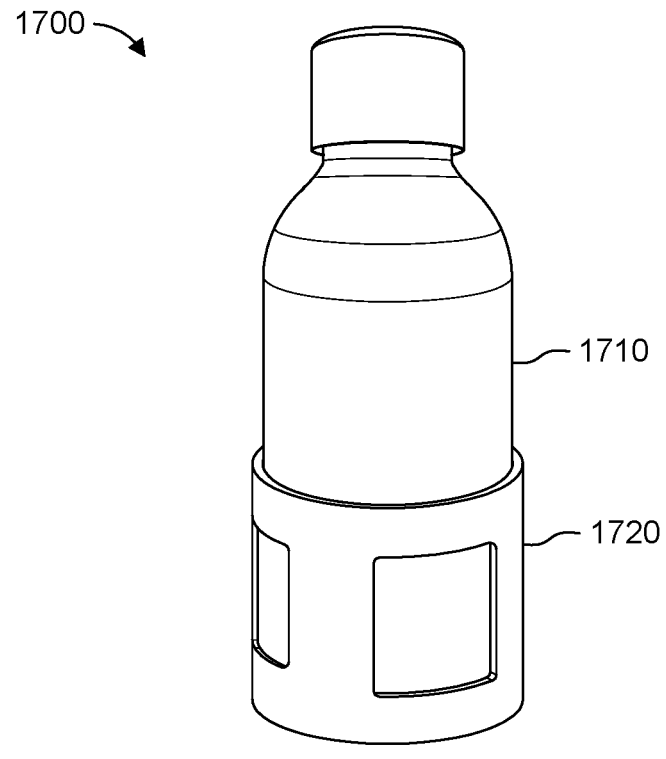
FIG. 6A illustrates an example of a 3D object according to an embodiment using haptic texture maps.

FIG. 6A illustrates an example of 3D object according to an embodiment using haptic texture maps. The 3D object 1700 represents a metallic bottle 1710 with a black soft rubber holder 1720 to isolate the user's hand from the temperature of the bottle. Conventionally, texture files may be used to describe the color, diffuse, emissive, normal, occlusion, roughness metallic, specular glossiness of the object materials and allow an appropriate (physical-based) rendering by the rendering engine based on the texture files.

Figure 6B:
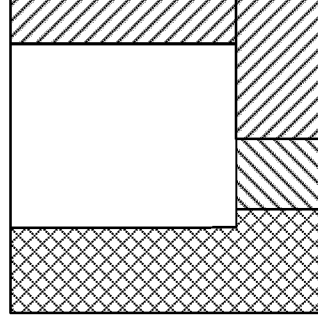
FIG. 6B illustrates an example of a temperature haptic effect according to an embodiment using haptic texture maps.
Figure 6C:
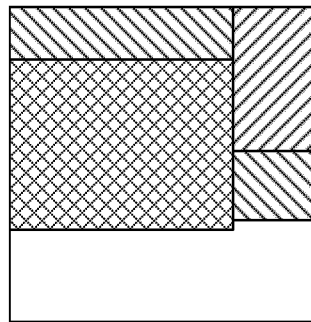
FIG. 6C illustrates an example of a rate-hardness haptic effect according to an embodiment using haptic texture maps.

In addition to displaying a representation of the 3D bottle, the rendering could benefit from a force feedback device to metallic bottle with a softer and warmer rubber holder 1720 by using additional textures information, encoded using similar principles based on texture maps. A temperature texture map illustrated in FIG. 6B determines the temperature on the surface of the object (the metallic part being colder than the plastic part) and a rate harness texture map illustrated in FIG. 6C indicates that the metallic part is rigid while the rubber holder is soft.

Using these haptic texture maps, once a user touches an object, the location of the haptic texture is determined, the relevant haptic information is obtained, and the corresponding haptic effect is rendered. This mechanism allows to define 3D objects with complex surfaces with heterogenous haptic data for different types of haptic features.

According to an embodiment, the glTF™-based syntax for defining a haptic effect comprises a haptic texture map to define the haptic effect. Different haptic features may be considered and need to be differentiated. In an embodiment, the haptic features listed in table 13 are considered.

TABLE 13

| ID | Haptic feature | Format | Range | Resolution |
|---|---|---|---|---|
| 0 | None | — | — | — |
| 1 | Rate-hardness | 8-bit | 0-10000 N · s−1/ m · s−1 | 40 N · s−1/ m · s−1 |
| 2 | Contact area spread rate | 8-bit | 0-25.6 N/cm 2 | 0.1 N/cm 2 |
| 3 | Local surface orientation | 24-bit (3 × 8-bit) | 2 × 0-180° | 0.002° |
| 4 | Local indentation | 8-bit | ±5 mm | 0.04 mm |
| 5 | Kinetic friction | 8-bit | ±5 | 0.04 |
| 6 | Static friction | 8-bit | ±5 | 0.04 |
| 7 | Relative temperature | 8-bit | ±25.4° | 0.2° |
| 8 | Temperature | 8-bit | [−50:+75]° C. | 0.5° C. |
| 9 | Dynamic stiffness | 8-bit | 0-255 | 1 -Index in table |
| 10 | Stroke spectral response | 8-bit | 0-255 | 1 -Index in table |
| 11 | Stick-slip | 8-bit | 0-255 | 1 - Index in table |

Dynamic stiffness, stroke spectral response and stick-slip do not encode directly a haptic value but use an index of a table. The IDs correspond to a file in which coefficient of auto-regressive filters are stored. They model the vibration measured with materials during a brief contact (dynamic stiffness) or a stroke (stroke spectral response or stick-slip transient), as illustrated in Table 14.

TABLE 14

| Dynamic Stiffness | |
|---|---|
| Material | ID |
| Stainless | 0 |
| Aluminum | 1 |
| Polycarbonate | 2 |
| Acryl | 3 |
| Wax | 4 |
| Etc. | . . . 255 |

Table 15 illustrates an example of syntax for defining haptic texture map properties for haptic objects according to at least one embodiment. This syntax allows to determine the parameters for different types of haptic effect:

"rate-hardness" allows to determine the hardness of the surface, in other words, it is defined as the initial rate of change of force over the penetration velocity, and is used to simulate both stiffness and damping behaviors with better stability. The value is stored in an 8-bit texture and covers values from 0 to 10000 N·s-1/m·s-1 with a resolution of 40 N·s-1/m·s-1, "contact-area-spread-rate" is defined as the rate by which the contact area spreads over the finger surface as the finger presses a surface. The value is stored in an 8-bit texture and covers values from 0 to 25.6 N·cm² with a resolution of 0.1 N·cm², "local-surface-orientation" allows to determine the curvature of a shape. The value is stored in an 24-bit texture (3×8 bit according to x,y,z direction) and covers values from 0 to 180 degrees with a resolution of 0.002 degree, "local-indentation" allows to determine the relief or microdetails of a surface. The value is stored in an 8-bit texture and covers values from −5 mm to +5 mm with a resolution of 0.04 mm, "kinetic-friction" allows to determine the coefficient of the kinetic friction, i.e. the force due to the friction between each object. The value is stored in an 8-bit texture and covers values from −5 to +5 with a resolution of 0.04, "static-friction" allows to determine the coefficient of the static friction, i.e. the force necessary to make to object slide over each other. The value is stored in an 8-bit texture and covers values from −5 to +5 with a resolution of 0.04, "temperature" allows to determine the absolute temperature of an object. The value is stored in an 8-bit texture and covers values from −50° C. to +75° C. with a resolution of 0.5° C., "relative-temperature" allows to determine the temperature relative of the user (for instance 37.5° C.). The value is stored in an 8-bit texture and covers values from −25.4° C. to +25.4° C. with a resolution of 0.2° C., "dynamic-stiffness" allows to determine the compliance of an object from a vibratory point of view, i.e. the transient vibration when the user strokes an object. The value is stored in an 8-bit texture and covers values from 0 to 255, the value being the id in an index table, "stroke-spectral-response" allows to determine the vibration caused by the friction between two objects. The value is stored in an 8-bit texture and covers values from 0 to 255, the value being the id in an index table, "stick-slip" allows to determine the vibratory phenomenon that is eventually observed on the transition between stiction and sliding. The value is stored in an 8-bit texture and covers values from 0 to 255, the value being the id in an index table.

TABLE 15

```
{
  "$schema": "http://json-schema.org/draft-04/schema",
  "title": "IDCC_Haptics_maps",
  "type": "object",
  "description": "A haptic object.",
  "allOf": [ { "$ref": "glTFChildOfRootProperty.schema.json" } ],
  "properties": {
    "rate-hardness": {
      "allOf": [ { "$ref": "textureInfo.schema.json" } ],
      "description": "The rate-hardness texture.",
      "gltf_detailedDescription": "Rate-hardness stored in a 8-bit
texture from [0,10000 N.s−1/m.s−1] with a resolution of 40 N.s−1/m.s−1"
    },
    "contact-area-spread-rate": {
      "allOf": [ { "$ref": "textureInfo.schema.json" } ],
      "description": "The contact area spread rate texture.",
      "gltf_detailedDescription": "Contact area spread rate stored in
a 8-bit texture from [0,25.6 N.cm^2] with a resolution of 0.1N.cm^2"
    },
    "local-surface-orientation": {
      "allOf": [ { "$ref": "textureInfo.schema.json" } ],
      "description": "The local surface orientation texture.",
      "gltf_detailedDescription": "Contact area spread rate stored in
a 24-bit texture (3x8bit) from [0,180 deg] with a resolution of 0.002 deg"
    },
    "local-identation": {
```

TABLE 15-continued

```
        "allOf": [ { "$ref": "textureInfo.schema.json" } ],
        "description": "The local indentation texture.",
        "gltf_detailedDescription": "Local indentation stored in a 8-bit
texture from [−5,5 mm] with a resolution of 0.04mm"
    },
    "kinetic-friction": {
        "allOf": [ { "$ref": "textureInfo.schema.json" } ],
        "description": "The kinectic friction.",
        "gltf_detailedDescription": "Kinectic friction stored in a 8-bit
texture from [−5,5] with a resolution of 0.04"
    },
    "static-friction": {
        "allOf": [ { "$ref": "textureInfo.schema.json" } ],
        "description": "The static friction.",
        "gltf_detailedDescription": "Static friction stored in a 8-bit
texture from [−5,5] with a resolution of 0.04"
    },
    "temperature": {
        "allOf": [ { "$ref": "textureInfo.schema.json" } ],
        "description": "The temperature texture.",
        "gltf_detailedDescription": "Temperature stored in 8-bit
texture from [−50,+75°C] with a resolution of 0.5°C"
    },
    "relative-temperature": {
        "allOf": [ { "$ref": "textureInfo.schema.json" } ],
        "description": "The relative temperature texture.",
        "gltf_detailedDescription": "Relative temperature stored in a 8-
bit texture from [−25.4,+25.4°C] with a resolution of 0.2°C"
    },
    "dynamic-stiffness": {
        "allOf": [ { "$ref": "textureInfo.schema.json" } ],
        "description": "The dynamic stiffness texture.",
        "gltf_detailedDescription": "Dynamic stiffness stored in a 8-bit
texture from [0,255]. Value being the id in a index table"
    },
    "stroke-spectral-response": {
        "allOf": [ { "$ref": "textureInfo.schema.json" } ],
        "description": "The stroke spectral response texture.",
        "gltf_detailedDescription": "Stroke spectral response stored in
a 8-bit texture from [0,255]. Value being the id in a index table"
    },
    "stick-slip": {
        "allOf": [ { "$ref": "textureInfo.schema.json" } ],
        "description": "The stick slip texture.",
        "gltf_detailedDescription": "Stick slip stored in a 8-bit texture
from [0,255]. Value being the id in a index table"
    },
    "custom": {
        "allOf": [ { "$ref": "textureInfo.schema.json" } ],
        "description": "Custom texture.",
        "gltf_detailedDescription": "Texture containing haptic data"
    },
    "name": { },
    "extensions": { },
    "extras": { }
    }
}
```

Figure 7A:
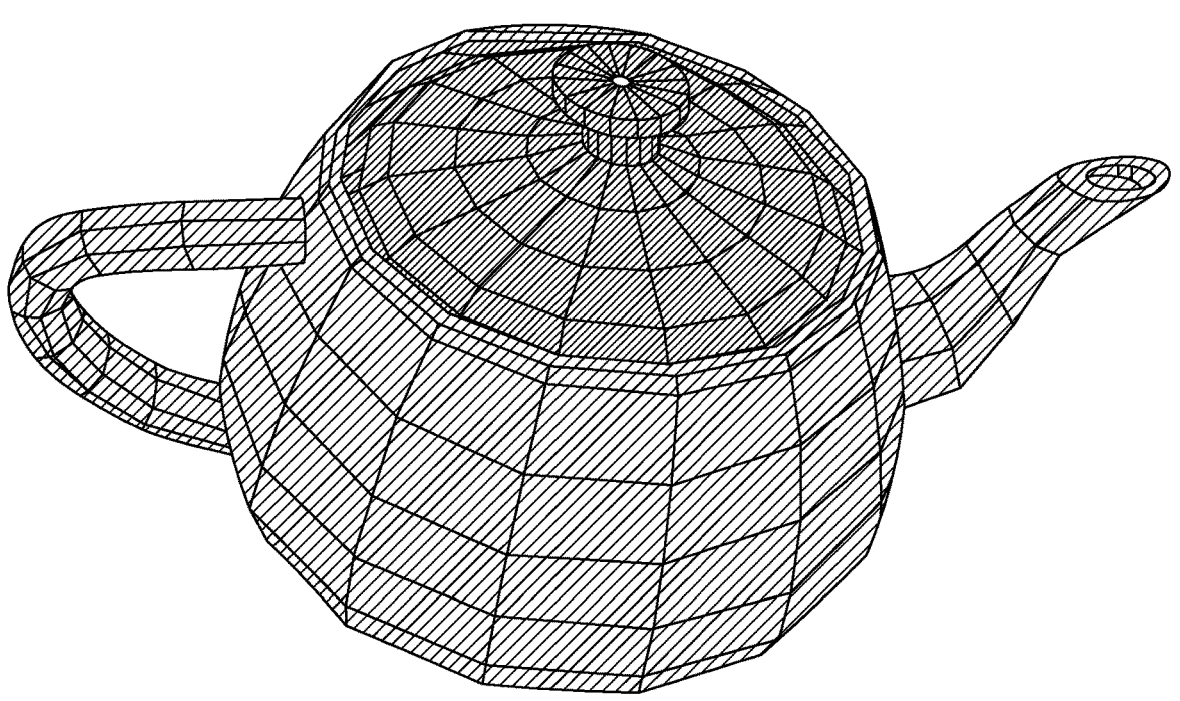
FIGS. 7A and 7B illustrate an example of a haptic object comprising haptic texture maps according to at least one embodiment.
Figure 7B:
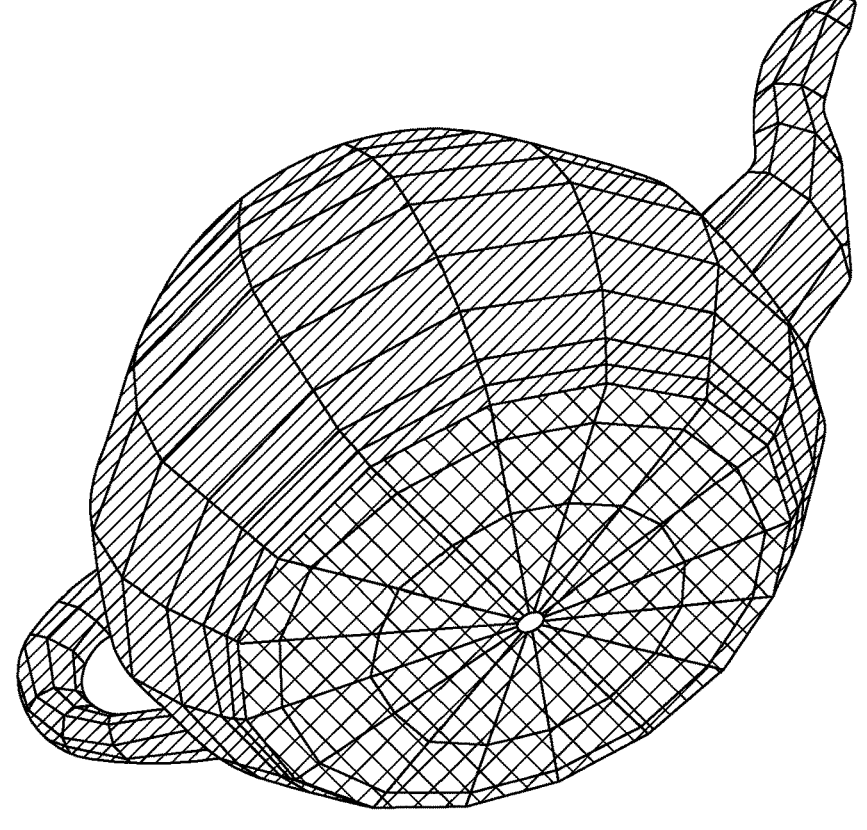

FIGS. 7A and 7B illustrate an example of a haptic object comprising haptic texture maps according to at least one embodiment. The object represents a teapot and the haptic effect is related to the temperature of the teapot. The geometry of the teapot is defined by a corresponding mesh.

The haptic temperature effect is defined by a haptic texture map applied to the geometry of the object that, in this example, defines the bottom of the teapot as being hot, the lid of the teapot as being cold and the sides of the teapot is varying from hot to cold. In these figures, an area with hot temperatures is represented as an area with light shade of grey while a dark shade of grey represents an area with cold temperatures: in other words, the lighter the hotter, the darker the colder. However, the values illustrated in the picture are not reflecting the temperatures as defined in Table 1 but are chosen arbitrarily to obtain an understandable illustration.

FIGS. 8A and 8B illustrate an example of scene description representing a haptic object comprising haptic texture maps according to at least one embodiment. The scene corresponds to the teapot with a temperature related haptic map as described in FIGS. 7A and 7B. The scene description syntax spans over FIGS. 8A and 8B. Starting from the end of the glTF™ description file, in FIG. 8B, the scene description 2001 comprises a single node named teapot. The set of nodes 2010 thus a single child node named teapot. The geometry is defined in 2020 as the first mesh with a translation to position the object within the scene. The single child node also comprises a haptic object 2030 that comprises two effects: a vibration effect 2031 and temperature haptic map 2032. The haptic map 2032 is defined as providing a haptic effect related to the "temperature" and uses the texture image of index '0', thus the first one, in the list of texture files 2040. The vibration effect is directly defined by its parameters: a vibration frequency of 250 Hz and an intensity of 0.7 to be applied on the mesh of the object since the ShapeType parameter is equal to 2. The other sections of the scene description file are related to the meshes defining the geometry of the object 2050, and in FIG. 8A, the materials 2060 defining the visual aspect of the surface through the defaultMat material, the buffer views 2070, the buffers storing the data 2075, the version number 2080, the description of the buffers 2085 and the list of extensions used 2090.

While a first example of syntax for carrying a haptic object has been described here above, a second example of syntax according to at least one embodiment is described hereafter. This second example of syntax allows to describe signals more precisely and in a more optimized fashion. For instance, a haptic effect can be defined once and then referenced multiple times to create a haptic signal, optionally with some variations. It also contains more signal parameters to provide a more complete solution to generate any type of signal.

Table 16 illustrates an example of syntax for the first level of the extension describing the global haptic experience according to at least one embodiment. It provides a description of the haptic object, lists the different avatars (i.e. body representation) and defines the required signals. A shape attribute is also added.

TABLE 16

```
{
    "$schema":"http://json-schema.org/draft-04/schema",
    "title":"IDCC_Haptics",
    "type":"object",
    "description":"A haptic object.",
    "allOf":[
        {
            "$ref":"glTFChildOfRootProperty.schema.json"
        }
    ],
    "properties":{
        "description":{
```

TABLE 16-continued

```
      "type":"string",
      "description":"Description of the data"
    },
    "avatars":{
      "type":"array",
      "description":"List of haptic avatars",
      "items":{
        "type":"object",
        "$ref":"IDCC_haptics.avatar.schema.json"
      }
    }
    "signals":{
      "type":"array",
      "description":"List of haptic signals",
      "items":{
        "type":"object",
        "$ref":"IDCC_haptics.signal.schema.json"
      }
    },
    "trigger":{
      "type":"string",
      "enum":[
        "Startup",
        "Collision",
        "Sight",
        "External"
      ],
      "description":"Trigger"
    },
    "shape":{
      "type":"integer",
      "description":"Specifies the shape of the haptic volume.",
      "anyOf":[
        {
          "enum":[0],
          "Sphere":"Sphere-like volume containing the haptic effect. Diameter of the sphere is
given by the scale of the object."
        },
        {
          "enum":[1],
          "Cube":"Cube-like volume containing the haptic effect. Shape of the cube is given by the
scale of the object."
        },
        {
          "enum":[2],
          "Custom":"Custom volume containing the haptic effect. The volume is defined by the
mesh associated to the node."
        },
        {
          "type":"integer"
        }
      ]
    },
    "accessors": {
      "type": "array",
      "description": "An array of accessors.",
      "items": {
        "$ref": "accessor.schema.json"
      },
      "minItems": 1,
      "gltf_detailedDescription": "An array of accessors. An accessor is a typed view into a
bufferView."
    },
    "buffers": {
      "type": "array",
      "description": "An array of buffers.",
      "items": {
        "$ref": "buffer.schema.json"
      },
      "minItems": 1,
      "gltf_detailedDescription": "An array of buffers. A buffer points to binary geometry,
animation, or skins."
    },
    "bufferViews": {
      "type": "array",
      "description": "An array of bufferViews.",
      "items": {
        "$ref": "bufferView.schema.json"
      },
      "minItems": 1,
```

TABLE 16-continued

```
    "gltf_detailedDescription": "An array of bufferViews. A bufferView is a view into a buffer
generally representing a subset of the buffer."
    },
    "name":{ },
    "extensions":{ },
    "extras":{ }
  },
  "required":[
    "shape"
  ]
}
```

The syntax illustrated in table 16 is based on the following elements:

description: String description of the signal.

avatars: List of all avatars used in this haptic experience. It references the avatar schema described below.

signals: List of all the signals attached to the haptic object. This array references the signal schema described below.

trigger: This keyword can be used to specify the events that triggers the haptic object.

shape: Defines the shape of the haptic object.

accessors: Array of information and references to buffer-Views. It references the glTF accessor schema defined in the official specifications of glTF 2.0.

bufferViews: Part of the buffer. It references the glTF bufferView schema defined in the official specifications of glTF 2.0.

buffers: Reference to the raw data. It references the glTF buffer schema defined in the official specifications of glTF 2.0.

In addition to the former syntax, a haptic signal may be described as illustrated in the syntax of table 17. This syntax contains a string description of the signal, some metadata information (e.g. signal type, type of encoder, sampling rate, etc.), a reference to an avatar and data of the signal. If the signal contains PCM data, it can be accessed with a reference to a file or an accessor to the buffer. For descriptive content, the list of all necessary effects is defined at this level. The list of channels finally completes the signal.

TABLE 17

```
{
    "$schema":"http://json-schema.org/draft-04/schema",
    "title":"IDCC_haptics_signal",
    "type":"object",
    "allOf":[{"$ref":"glTFProperty.schema.json"}],
    "properties":{
      "description":{
        "type":"string",
        "description":"Signal description"
      },
      "signal_type":{
        "type":"string",
        "enum":["Pressure", "Force", "Acceleration", "Velocity", "Position", "Temperature",
"Vibration", "Water", "Wind", "Other"],
        "description":"Type of signal"
      },
      "encoder":{
        "type":"string",
        "enum":["Raw", "Descriptive", "PCM_Lossy", "PCM_Lossless"],
        "description":"Type of encoding used for the signal"
      },
      "sampling_rate":{
        "type":"number",
        "description":"Sampling rate of the signal",
        "default":8000.0
      },
      "bit_depth":{
        "type":"integer",
        "description":"Size of each sample",
        "default":16
      },
      "nb_channels":{
        "type":"integer",
        "description":"Number of channels of the signal data",
        "minimum":0,
        "default":1
      },
      "nb_samples_per_channel":{
        "type":"integer",
        "description":"Number of samples per channel",
        "minimum":0,
        "default":0
      },
      "nb_reduced_samples_per_channel ":{
```

```
    "type":"integer",
    "description":"Number of samples per channel after down-sampling",
    "minimum":0,
    "default":0
  },
  "avatar_id":{
    "type":"integer",
    "description":"ID of the body model"
  },
  "signal_file":{
    "type":"string",
    "description":"data file containing the signal (AHAP, IVS, WAV, IEEE, etc)",
    "default":""
  },
  "signal_accessor":{
    "allOf":[{"$ref":"glTFid.schema.json"}],
    "description":"The index of an accessor containing the data.",
    "gltf_detailedDescription":"The index of an accessor containing the data. That accessor must
have componentType 'FLOAT' and must respect the WAV format. Ignored if file exists."
  },
  "effect_list":{
    "type":"array",
    "description":"List of effects used in the channels",
    "items":{
      "type":"object",
      "$ref":"IDCC_haptics.effect.schema.json"
    },
    "minItems":1
  },
  "channels":{
    "type":"array",
    "description":"List of channels ",
    "items":{
      "type":"object",
      "$ref":"IDCC_haptics.channel.schema.json"
    },
    "minItems":1
  }
},
"required":[
  "type",
  "nb_channels",
  "avatar_id",
  "effect_list",
  "channels"
]
}
```

The syntax illustrated in table 17 is based on the following elements:

description: String description of the signal.

signal_type: Specifies the type of haptic stimuli (vibration, temperature, force, . . . )

encoder: Specifies the type of encoder used to store the signal. "Raw" means that the signal file is referenced without any type of encoding. "Descriptive" is used when the signal is described using only the glTF extension (it could be translated from IVS or AHAP files for instance). "PCM_Lossy" and "PCM_Lossless" indicate that the signal is encoded using dedicated encoders (respectively AAC and ALS codecs here).

sampling_rate: sampling rate of the signal.

bit_depth: bit depth of the referenced data.

nb_channels: number of channels of the signal.

nb_samples_per_channel: number of samples in each channel.

nb_reduced_samples_per_channel: number of samples in each channel after down-sampling.

avatar_id: Id of the avatar previously described with the avatar schema described below.

signal_file: path to the file containing the haptic data. It could be Any type of file, including way, ahap, ivs, aac or other data format.

signal_accessor: accessor id of the data in the buffer.

effect_list: List of all the haptic effects used in the signal. It references the haptic effect schema described below.

channels: List of channels of the signal. It references the haptic channel schema described below.

A haptic effect may be described as illustrated in the syntax of table 18. This syntax defines a basis effect that can be referenced in the timeline of a haptic channel. It allows to describe only once an effect and then reference it multiple times in different channels. Effects may be described using different properties. We defined five types of effects: Continuous, Periodic, Transient, PCM or Timeline. Continuous and Periodic effects may be defined using one or several properties. Intensity, attack time, fade time, attack level and decay level for instance can be used to define a simple effect (similar to IVS). More advanced effects can be described using the envelope property that allows to define a curve by specifying key points. Transient effect may be defined only with an intensity and a sharpness value. PCM effects may simply reference raw data stored in the buffer. Properties such as intensity, attack_time, fade_time, envelope or others can be used as multipliers to these effects. Timeline effects are simply timed references to previously defined basis effects.

TABLE 18

```
{
  "$schema":"http://json-schema.org/draft-04/schema",
  "title":"IDCC_haptics_effect",
  "type":"object",
  "allOf":[{"$ref":"glTFProperty.schema.json"}],
  "properties":{
    "id":{
      "type":"integer",
      "description":"Effect id"
    },
    "effect_type":{
      "type":"string",
      "enum":["Continuous", "Periodic", "Transient", "PCM", "Timeline"],
      "description":"Type of effect: continuous, periodic or transient"
    },
    "PCM_data":{
      "allOf":[{"$ref":"glTFid.schema.json"}],
      "description":"The index of an accessor containing the data.",
      "gltf_detailedDescription":"The index of an accessor containing the data. That accessor must
have componentType 'FLOAT'."
    },
    "intensity":{
      "type":"number",
      "description":"Intensity of the effect",
      "minimum":-1.0,
      "maximum":1.0,
      "default":1.0
    },
    "sharpness":{
      "type":"number",
      "description":"Sharpness of the effect",
      "minimum":-1.0,
      "maximum":1.0,
      "default":0.5
    },
    "duration":{
      "type":"number",
      "description":"Duration of the effect",
      "minimum":0.0
    },
    "attack_time":{
      "type":"number",
      "description":"Duration of the attack period",
      "minimum":0.0
    },
    "fade_time":{
      "type":"number",
      "description":"Duration of the attack period",
      "minimum":0.0
    },
    "release_time":{
      "type":"number",
      "description":"The amount of time it takes for a sustained intensity envelope to reach zero
after the event finishes",
      "minimum":0
    },
    "attack_level":{
      "type":"number",
      "description":"Level of the attack period",
      "minimum":-1.0,
      "maximum":1.0,
      "default":0.0
    },
    "decay_level":{
      "type":"number",
      "description":"Level of the decay period",
      "minimum":-1.0,
      "maximum":1.0,
      "default":0.0
    },
    "enveloppe":{
      "description":"Enveloppe of the signal (timestamp)",
      "type":"array",
      "items":{
        "type":"object",
        "properties":{
          "time":{
            "type":"number",
            "description":"Timestamp"
          },
```

TABLE 18-continued

```
         "magnitude":{
            "type":"number",
            "description":"Magnitude",
            "minimum":-1.0,
            "maximum":1.0,
            "default":0.0
            }
          }
        }
      },
    "wave_frequency":{
      "type":"number",
      "description":"Wave frequency used for a periodic signal"
    },
    "waveform":{
      "type":"string",
      "enum":[
        "Square",
        "Triangle",
        "Sine",
        "Sawtooth_up",
        "Sawtooth_down"
      ],
      "description":"Style of the effect used for the rendering"
    },
    "timeline":{
      "type":"array",
      "items":{
        "type":"object",
        "$ref":"IDCC_haptics.reference.schema.json"
      }
    }
  },
  "required":[
    "id",
    "effect_type"
  ]
}
```

The syntax illustrated in table 18 is based on the following elements:

id: Id of the effect.

effect_type: Specifies the type of haptic effect. Effect types include Continuous effect (e.g. non periodic effects used for Force feedback), Periodic effect (e.g. Sinusoidal effects used for vibration), Transient (e.g. brief and compact vibration effects feel like taps), PCM (i.e. raw signal data) or Timeline effects that reference other existing effects.

PCM_data: accessor to the raw data of the effect.

intensity: Intensity of the effect. If the effect uses PCM Data, envelope data or a timeline, this property can be used as a multiplier.

sharpness: Defines the sharpness of the effect.

duration: Duration of the effect.

attack_time: duration of the attack phase of the effect.

fade_time: duration of the decay phase of the effect.

release_time: amount of time it takes for a sustained intensity envelope to reach zero after the event finishes.

attack_level: Intensity at the beginning of the signal.

decay_level: Intensity at the end of the signal.

envelope: array of keyframes defining the envelope of the signal.

wave_frequency: Frequency of a periodic effect.

waveform: waveform of a periodic effect.

timeline: Timeline of effects.

Figure 9:
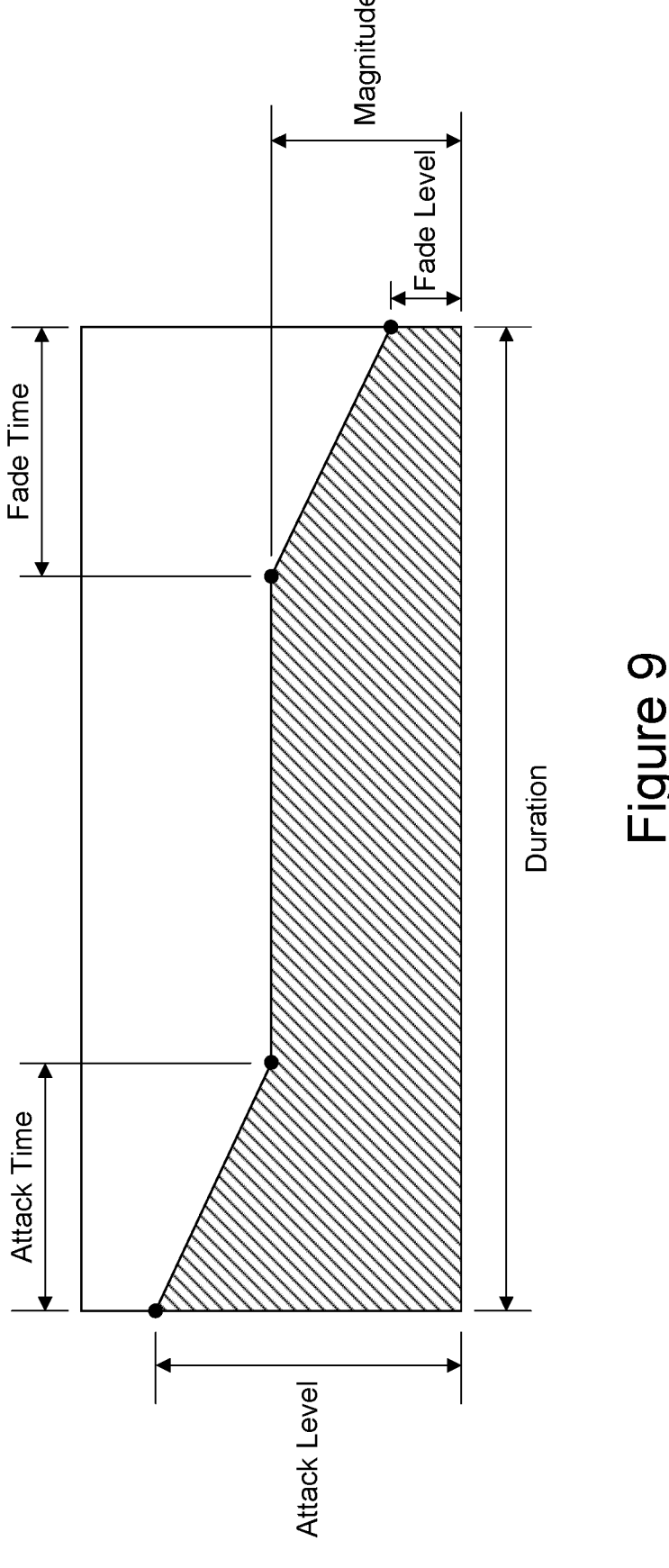
FIG. 9 illustrates various haptic effect properties of a continuous effect.

The various haptic effect properties of a continuous effect are illustrated in FIG. 9.

The haptic channel extension provides specific metadata information for each channel of a signal. As shown in the syntax of table 19, it includes a description, a gain, a mixing weight (to eventually merge signals together), a body part mask (following the same convention as OHM to locate the effect), an accessor to a list of vertices (to provide more accurate body localization). For descriptive content, the effect timeline is used to reference and organize in time effects defined at the signal level. Finally, the property timeline can be used as an additional way to adjust intensity and sharpness parameters in time.

TABLE 19

```
{
  "$schema":"http://json-schema.org/draft-04/schema",
  "title":"IDCC_haptics_channel",
  "type":"object",
  "allOf":[{"$ref":"glTFProperty.schema.json"}],
  "properties":{
    "id":{
      "type":"integer",
      "description":"Channel id"
    },
    "description":{
```

TABLE 19-continued

```
        "type":"string",
        "description":"Channel description"
    },
    "gain":{
        "type":"number",
        "description":"Gain",
        "default":1.0
    },
    "mixing_weight":{
        "type":"number",
        "description":"Mixing weight",
        "default":1.0
    },
    "body_part_mask":{
        "type":"integer",
        "description":"Binary mask specifying body parts on which to apply the effect. One per
channel",
        "minimum":0,
        "default":0
    },
    "vertices":{
        "$ref":"glTFid.schema.json",
        "description":"The index of an accessor containing the vertices to stimulate."
    },
    "effect_timeline":{
        "type":"array",
        "items":{
            "type":"object",
            "$ref":"IDCC_haptics.reference.schema.json"
        }
    },
    "properties_timeline":{
        "type":"array",
        "items":{
            "type":"object",
            "$ref":"IDCC_haptics.properties.schema.json"
        }
    }
},
"required":[
    "id",
    "gain",
    "body_part_mask",
    "effect_timeline"
]
}
```

The syntax illustrated in table 19 is based on the following elements:

id: Id of the channel.

description: Description of the channel.

gain: Gain to apply to every effect in this channel.

mixing weight: Weight optionally specified to blend channels together.

body_part_mask: body mask specifying the location on the body where the effects of this channel should be applied.

vertices: vertices of the avatar defining the location on the body where the effects of this channel should be applied.

effect_timeline: Timeline of effects of the channel. It uses the haptic reference schema defined below.

properties_timeline: Timeline of properties. Properties as defined here are used as multipliers to change the magnitude or the sharpness of a signal's channel in time.

Haptic references, as illustrated in the syntax of table 20, may be used within a timeline to reference a haptic effect defined at the signal level. It requires only the id of the effect and a starting time. It also offers the possibility to overwrite properties of the referenced effect. With this feature, the same effect may be use multiple times in different channels with slight variations.

TABLE 20

```
{
    "$schema":"http://json-schema.org/draft-04/schema",
    "title":"IDCC_haptics_reference",
    "type":"object",
    "allOf":[{"$ref":"glTFProperty.schema.json"}],
    "properties":{
        "id":{
            "type":"integer",
            "description":"id of the referenced effect"
        },
        "starting_time":{
            "type":"number",
```

TABLE 20-continued

```
      "description":"Starting time"
    },
    "effect_type":{
      "type":"string",
      "enum":["Continuous", "Periodic", "Transient", "PCM", "Timeline"],
      "description":"Type of effect: continuous, periodic or transient"
    },
    "wave_frequency":{
      "type":"number",
      "description":"Wave frequency used for a periodic signal"
    },
    "waveform":{
      "type":"string",
      "enum":["Square", "Triangle", "Sine", "Sawtooth_up", "Sawtooth_down"],
      "description":"Style of the effect used for the rendering"
    },
    "intensity":{
      "type":"number",
      "description":"Intensity of the effect",
      "minimum":-1.0,
      "maximum":1.0,
      "default":1.0
    },
    "sharpness":{
      "type":"number",
      "description":"Sharpness of the effect",
      "minimum":-1.0,
      "maximum":1.0,
      "default":0.5
    },
    "duration":{
      "type":"number",
      "description":"Duration of the effect",
      "minimum":0.0
    },
    "attack_time":{
      "type":"number",
      "description":"Duration of the attack period",
      "minimum":0.0
    },
    "fade_time":{
      "type":"number",
      "description":"Duration of the attack period",
      "minimum":0.0
    },
    "release_time":{
      "type":"number",
      "description":"The amount of time it takes for a sustained intensity envelope to
reach zero after the event finishes",
      "minimum":0.0
    },
    "attack_level":{
      "type":"number",
      "description":"Level of the attack period",
      "minimum":-1.0,
      "maximum":1.0,
      "default":0.0
    },
    "decay_level":{
      "type":"number",
      "description":"Level of the decay period",
      "minimum":-1.0,
      "maximum":1.0,
      "default":0.0
    }
  },
  "required":[
    "id",
    "effect_type"
  ]
}
```

The syntax illustrated in table 20 is based on the following elements:

id: Id of the referenced effect.

starting_time: starting time of the referenced effect on the timeline.

effect_type wave_frequency waveform intensity sharpness duration attack_time fade_time release_time attack_level decay_level All of these parameters except 'id' and 'starting time' are optional parameters and may be used to overwrite properties of the referenced effect. These are the same as the ones defined for the effect schema in table 18. One example is to reuse a haptic effect but with lower intensity. As already mentioned this allows to optimize the definition of the overall scene by reusing some parameters.

This extension can be used with the property timeline of a channel to adjust intensity or sharpness parameters as shown in the syntax of table 21. It is used as a multiplier. The properties can be defined using single values or curves defined with keypoints.

TABLE 21

```
{
  "$schema":"http://json-schema.org/draft-04/schema",
  "title":"IDCC_haptics_properties",
  "type":"object",
  "allOf":[{"$ref":"glTFProperty.schema.json"}],
  "properties":{
    "property_type":{
      "type":"string",
      "enum":["Intensity", "Sharpness", "Intensity_curve", "Sharpness_curve"],
      "description":"Type of property: Intensity, Sharpness, Intensity curve or Sharpness curve"
    },
    "value":{
      "type":"string",
      "description":"Value of the property"
    },
    "curve":{
      "description":"Curve associated to a property (timestamp)",
      "type":"array",
      "items":{
        "type":"object",
        "properties":{
          "time":{
            "type":"number",
            "description":"Timestamp"
          },
          "value":{
            "type":"number",
            "description":"Magnitude",
            "minimum":-1.0,
            "maximum":1.0,
            "default":0.0
          }
        }
      }
    }
  },
  "required":[
    "property_type"
  ]
}
```

41

42

The syntax illustrated in table 21 is based on the following elements:

property_type: Type of the property. It specifies whether the property is a single value or a curve and if it should be applied to the intensity or the sharpness.

value: value of the property.

curve: Array of keyframes defined by a value and a timestamp.

Haptic avatars are used as body representation for the haptic effect. As illustrated in the syntax of table 22, different types of avatars may be defined and a custom mesh from the buffer may be referenced to determine a specific geometry.

TABLE 22

```
{
  "$schema":"http://json-schema.org/draft-04/schema",
  "title":"IDCC_Haptics_avatar",
  "type":"object",
  "description":"A haptic avatar.",
  "allOf":[{"$ref":"glTFChildOfRootProperty.schema.json"}],
  "properties":{
    "id":{
      "type":"number",
      "description":"ID for the avatar description (one may have one mesh resolution per type of
haptic signal).",
      "minimum":0,
      "default":0
    },
    "lod":{
      "type":"integer",
      "description":"Number specifying the level of details of the avatar: 0, 1 or 2 for respectively
low, average and high resolution. It allows to use more or less complex representations.",
      "anyOf":[
        {
          "enum":[0],
          "Low":"low-level lod representation."
        },
        {
          "enum":[1],
          "Average":"average-level lod representation."
        },
        {
          "enum":[2],
          "High":"high-level lod representation."
        },
        {
          "type":"integer"
        }
      ]
    },
    "type":{
      "type":"integer",
      "description":"Specifies the type of haptic perception represented by the avatar. It refers to a
generic model except for Custom (3) where the mesh is provided in the gltf buffer of this node",
      "anyOf":[
        {
          "enum":[0],
          "Vibration":"Human body model representing vibration spatial acuity."
        },
        {
          "enum":[1],
          "Pressure":"Human body model representing pressure spatial acuity."
        },
        {
          "enum":[2],
          "Temperature":"Human body model representing temperature spatial acuity.."
        },
        {
          "enum":[3],
          "Custom":"Custom human body model. Mesh is provided in the gltf buffer."
        },
        {
          "type":"integer"
        }
      ]
    },
    "mesh":{
      "allOf":[{"$ref":"mesh.schema.json"}],
      "description":"The mesh associated with an avatar."
    },
    "name":{ },
    "extensions":{ },
    "extras":{ }
  },
  "required":[
    "type",
```

TABLE 22-continued

```
        "lod",
        "id"
    ]
}
```

The syntax illustrated in table 22 is based on the following elements:

id: Id of the avatar.

lod: Level of details of the avatar.

type: Predefined types of avatars, including Vibration, Pressure and Temperature. Other avatars can be described using the "Custom" type and a mesh.

mesh: mesh of the avatar.

The syntax illustrated in table 23 defines a first example of haptic object using a signal given in a companion file "vibration.wav".

TABLE 23

```
{
    "extensionsUsed":[
        "IDCC_Haptics"
    ],
    "asset":{
        "version":"2.0"
    },
    "buffers":[
        {
            "uri":"haptic_loader.bin",
            "byteLength":0
        }
    ],
    "nodes":[
        {
            "translation":[
                -2.943,
                0.0,
                0.0
            ],
            "name":"Pressure Object",
            "extensions":{
                "IDCCHaptics":{
                    "signals":[
                        {
                            "signal_type":"Vibration",
                            "sampling_rate":8000,
                            "bit_depth":16,
                            "nb_channels":1,
                            "avatar_id":0,
                            "signal_file":"vibration.wav",
                            "description":"Vibration effect",
                            "encoder":"Raw",
                            "channel_list":[
                                {
                                    "channel_id":0,
                                    "gain":1,
                                    "mixing_weight":1,
                                    "body_part_mask":131072,
                                    "description":"Left Hand Palm"
                                }
                            ]
                        }
                    ]
                    "avatars":[
                        {
                            "avatar_id":0,
                            "avatar_lod":"Average",
                            "avatar_type":"Vibration"
                        }
                    ],
                    "shape":"Sphere",
                    "description":"Vibrating haptic object"
                }
            }
        }
    }
```

TABLE 23-continued

```
    ],
    "scene":0,
    "scenes":[
        {
            "nodes":[
                0
            ],
            "name":"haptic_example"
        }
    ]
}
```

The syntax illustrated in table 24 defines a second example of haptic object comprising a fully descriptive signal.

TABLE 24

```
{
    "extensionsUsed":[
        "IDCC_Haptics"
    ],
    "asset":{
        "version":"2.0"
    },
    "buffers":[
        {
            "uri":"haptic_loader.bin",
            "byteLength":0
        }
    ],
    "nodes": [
        {
            "translation":[
                1,
                0.0,
                0.0
            ],
            "name":"Vibration Object",
            "extensions":{
                "IDCCHaptics":{
                    "signals":[
                        {
                            "signal_type":"Vibration",
                            "sampling_rate":8000,
                            "bit_depth":16,
                            "nb_channels":1,
                            "avatar_id":0,
                            "description":"Vibration effect",
                            "encoder":"Gltf",
                            "effect_list": [
                                {
                                    "effect_id":"0",
                                    "effect_type":"Periodic",
                                    "effect_form":"Sine",
                                    "wave_frequency":100,
                                    "sharpness":0.5,
                                    "duration":0.02,
                                    "intensity":0.8
                                },
                                {
                                    "effect_id":"1",
                                    "effect_type":"Timeline",
                                    "timeline":[
                                        {
                                            "starting_time":0,
                                            "effect_id":"0"
                                        },
                                        {
                                            "starting_time":0.2,
```

TABLE 24-continued

```
            "effect_id":"0"
        }
    ]
}
    },
    "channel_list":[
    {
        "channel_id":0,
        "gain":1,
        "mixing_weight":1,
        "body_part_mask":131072,
        "description":"Left Hand Palm"
    }
    ]
    }
    ],
    "avatars":[
    {
        "avatar_id":0,
        "avatar_lod":"Average",
        "avatar_type":"Vibration"
    }
    ],
    "shape":"Sphere",
    "description":"Vibrating haptic object "
    }
    }
    }
],
"scene":0,
"scenes":[
    {
        "nodes":[
            0
        ],
        "name":"haptic_example"
    }
]
}
```

The term "user" is used throughout this document. It is meant to cover not only human users but also animals. An example of use case is about notifying a dog of its entrance in a restricted area. For that purpose, a haptic rendering device may take the form of a vibrating dog collar. When the dog enters a restricted area, a vibration is provided. In this case, the body model uses an appropriate mesh.

Although different embodiments have been described separately, any combination of the embodiments together can be done while respecting the principles of the disclosure.

Although embodiments are related to haptic effects, the person skilled in the art will appreciate that the same principles could apply to other effects such as the sensorial effects for example and thus would comprise smell and taste. Appropriate syntax would thus determine the appropriate parameters related to these effects.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Additionally, this application or its claims may refer to "obtaining" various pieces of information. Obtaining is, as with "accessing", intended to be a broad term. Obtaining the information may include one or more of, for example, receiving the information, accessing the information, or retrieving the information (for example, from memory or optical media storage). Further, "obtaining" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The invention claimed is:

1. A method comprising:
obtaining, for an immersive scene comprising a haptic effect, an immersive scene description based on a data structure comprising a JavaScript Object Notation (JSON) file defining a scene graph of nodes and referencing binary data for geometry, the immersive scene description comprising a node which comprises: a data structure representative of at least one virtual object of the immersive scene and a data structure representative of at least one haptic object of the immersive scene, the data structure representative of the at least one haptic object comprising a type of the haptic effect, at least one parameter of the haptic effect, and a haptic volume or surface where the haptic effect is to be activated, wherein the haptic volume or surface is determined by the geometry or a surface of the geometry of the at least one virtual object comprised in a same node;
detecting a collision between a position of a representation of a user in a representation of the immersive scene and the haptic volume or surface; and
preparing data for rendering the representation of the immersive scene, wherein the data for rendering is generated based on the at least one virtual object and, responsively to the collision detection, the type of the haptic effect and the at least one parameter of the haptic effect.

2. The method of claim 1, wherein the type of the haptic effect is vibration, pressure, temperature, or movement.

3. The method of claim 1, wherein the at least one parameter of the haptic effect describes a signal to be applied to a haptic actuator to render the haptic effect.

4. The method of claim 1, wherein the at least one parameter of the haptic effect comprises an identification of a file comprising a haptic signal to be applied.

5. The method of claim 1, wherein the haptic volume or surface is a two-dimensional (2D) plane, a sphere, an ellipsoid, a cube, a parallelepiped, or a capsule.

6. The method of claim 1, wherein the at least one virtual object of the immersive scene is a three-dimensional (3D) object, 2D or 3D video, or omnidirectional video.

7. The method of claim 1, wherein the at least one parameter of the haptic effect is a texture map.

8. A device comprising a processor configured to:

obtain, for an immersive scene comprising a haptic effect, a data structure representing an immersive scene description, the data structure being based on a data format comprising a JavaScript Object Notation (JSON) file defining a scene graph of nodes and referencing binary data for geometry, the immersive scene description comprising a node which comprises: a data structure representative of at least one virtual object of the immersive scene and a data structure representative of at least one haptic object of the immersive scene, the data structure representative of the at least one haptic object comprising a type of the haptic effect, at least one parameter of the haptic effect, and a haptic volume or surface where the haptic effect is to be activated, wherein the haptic volume or surface is determined by the geometry or a surface of the geometry of the at least one virtual object comprised in a same node;

detect a collision between a position of a representation of a user in a representation of the immersive scene and the haptic volume or surface; and prepare data for rendering the representation of the immersive scene, wherein the data for rendering is generated based on the at least one virtual object and, responsively to the collision detection, the type of the haptic effect and the at least one parameter of the haptic effect.

9. The device of claim 8, wherein the type of the haptic effect is vibration, pressure, temperature, or movement.

10. The device of claim 8, wherein the at least one parameter of the haptic effect describes a signal to be applied to a haptic actuator to render the haptic effect.

11. The device of claim 8, wherein the at least one parameter of the haptic effect comprises an identification of a file comprising a haptic signal to be applied.

12. The device of claim 8, wherein the haptic volume or surface is a two-dimensional (2D) plane, a sphere, an ellipsoid, a cube, a parallelepiped, or a capsule.

13. The device of claim 8, wherein the at least one virtual object of the immersive scene is a three-dimensional (3D) object, 2D or 3D video, or omnidirectional video.

14. The device of claim 8, wherein the at least one parameter of the haptic effect is a texture map.

15. The device of claim 8, wherein the device is further configured to render the haptic effect by applying a haptic signal to a haptic actuator according to the at least one parameter of the haptic effect.

16. A non-transitory computer readable medium having stored instructions that, when executed by a processor, cause the processor to:

obtain, for an immersive scene comprising a haptic effect, a data structure representing an immersive scene description, the data structure being based on a data format comprising a JavaScript Object Notation (JSON) file defining a scene graph of nodes and referencing binary data for geometry, the immersive scene description comprising a node which comprises: a data structure representative of at least one virtual object of the immersive scene and a data structure representative of at least one haptic object of the immersive scene, the data structure representative of the at least one haptic object comprising a type of the haptic effect, at least one parameter of the haptic effect, and a haptic volume or surface where the haptic effect is to be activated, wherein the haptic volume or surface is determined by the geometry or a surface of the geometry of the at least one virtual object comprised in a same node;

detect a collision between a position of a representation of a user in a representation of the immersive scene and the haptic volume or surface; and prepare data for rendering the representation of the immersive scene, wherein the data for rendering is generated based on the at least one virtual object and, responsively to the collision detection, the type of the haptic effect and the at least one parameter of the haptic effect.

17. The non-transitory computer readable medium of claim 16, wherein the type of the haptic effect is vibration, pressure, temperature, or movement.

18. The non-transitory computer readable medium of claim 16, wherein the at least one parameter of the haptic effect describes a signal to be applied to a haptic actuator to render the haptic effect.

19. The non-transitory computer readable medium of claim 16, wherein the at least one parameter of the haptic effect comprises an identification of a file comprising a haptic signal to be applied.

20. The non-transitory computer readable medium of claim 16, wherein the at least one parameter of the haptic effect is a texture map.

* * * * *